United States Patent
Kurohata

(10) Patent No.: US 9,552,488 B2
(45) Date of Patent: Jan. 24, 2017

(54) IMAGE FORMING APPARATUS

(75) Inventor: Takao Kurohata, Toyohashi (JP)

(73) Assignee: KONICA MINOLTA BUSINESS TECHNOLOGIES, INC., Chiyoda-ku, Tokyo (JP)

( * ) Notice: Subject to any disclaimer, the term of this patent is extended or adjusted under 35 U.S.C. 154(b) by 281 days.

(21) Appl. No.: 13/329,851

(22) Filed: Dec. 19, 2011

(65) Prior Publication Data
US 2012/0154849 A1    Jun. 21, 2012

(30) Foreign Application Priority Data
Dec. 20, 2010    (JP) ................. 2010-282848

(51) Int. Cl.
G06K 15/02    (2006.01)
G06F 21/60    (2013.01)

(52) U.S. Cl.
CPC .................. G06F 21/608 (2013.01)

(58) Field of Classification Search
None
See application file for complete search history.

(56) References Cited

U.S. PATENT DOCUMENTS

| | | | | |
|---|---|---|---|---|
| 5,579,447 A * | 11/1996 | Salgado | ........... | G06F 3/1296 358/1.15 |
| 5,940,582 A * | 8/1999 | Akabori | ........... | G06F 3/1204 358/1.13 |
| 5,990,891 A * | 11/1999 | Fukaya | ........... | G06F 3/0481 715/812 |
| 8,040,538 B2 * | 10/2011 | Minamizawa | ........... | G06F 21/32 358/1.13 |
| 8,139,247 B2 * | 3/2012 | Nishizawa | ........... | G06F 21/608 358/1.13 |
| 8,595,727 B2 * | 11/2013 | Nakahara | ........... | G06F 21/608 715/700 |
| 2002/0023071 A1 * | 2/2002 | Takahashi | ........... | G06F 17/30067 |

(Continued)

FOREIGN PATENT DOCUMENTS

JP    7-76155 A    3/1995
JP    2004-21458 A    1/2004

(Continued)

OTHER PUBLICATIONS

Office Action (Notification of Reasons for Refusal) issued by the Japanese Patent Office on Mar. 19, 2013, in the corresponding Japanese Patent Application No. 2010-282848, and an English Translation thereof. (6 pages).

(Continued)

*Primary Examiner* — Ted Barnes
(74) *Attorney, Agent, or Firm* — Buchanan Ingersoll & Rooney PC

(57) ABSTRACT

An image forming apparatus is provided that receives data for an authentication print job from an external terminal connected thereto via a network, receives a user authentication request from a user, and executes the job when the user authentication is successfully performed. The image forming apparatus comprises: a display unit; and a display control unit displaying information related to an amount of time expected to be required for the execution of the job on the display unit when the user authentication is successfully performed prior to completion of the reception of the data for the job.

2 Claims, 12 Drawing Sheets

(56) References Cited

U.S. PATENT DOCUMENTS

| | | | | |
|---|---|---|---|---|
| 2002/0057455 A1* | 5/2002 | Gotoh | G06F 3/1207 | 358/1.15 |
| 2002/0062487 A1* | 5/2002 | Ohno | H04N 21/4117 | 725/133 |
| 2002/0116508 A1* | 8/2002 | Khan | H04L 12/587 | 709/229 |
| 2002/0171864 A1* | 11/2002 | Sesek | G06K 15/00 | 358/1.15 |
| 2003/0020957 A1* | 1/2003 | Brewster | G06K 15/181 | 358/3.28 |
| 2004/0184080 A1* | 9/2004 | Gotoh | G06F 3/1207 | 358/1.15 |
| 2005/0080771 A1* | 4/2005 | Fish | G06F 17/30864 | |
| 2005/0097188 A1* | 5/2005 | Fish | G06F 17/30672 | 709/217 |
| 2005/0100378 A1* | 5/2005 | Kimura | G06F 3/1222 | 400/76 |
| 2005/0192910 A1* | 9/2005 | Auberger | G07B 17/00314 | 705/401 |
| 2005/0275867 A1* | 12/2005 | Higashiura | G06K 15/00 | 358/1.14 |
| 2006/0274355 A1* | 12/2006 | Ferlitsch | G06F 21/608 | 358/1.15 |
| 2007/0008577 A1* | 1/2007 | Matsuura | G06F 3/1204 | 358/1.15 |
| 2007/0081186 A1* | 4/2007 | Numata | H04N 1/00352 | 358/1.15 |
| 2007/0127054 A1* | 6/2007 | Nishizawa | G06F 21/608 | 358/1.14 |
| 2007/0279668 A1* | 12/2007 | Czyszczewski | G06F 3/1204 | 358/1.14 |
| 2008/0095426 A1* | 4/2008 | Hasebe | G06F 17/30026 | 382/138 |
| 2008/0130889 A1* | 6/2008 | Qi | H04L 63/0435 | 380/257 |
| 2008/0130894 A1* | 6/2008 | Qj | H04L 63/0485 | 380/277 |
| 2008/0207307 A1* | 8/2008 | Cunningham II | G06F 21/105 | 463/25 |
| 2008/0231882 A1* | 9/2008 | Fuchigami | H04N 1/00204 | 358/1.15 |
| 2008/0309975 A1* | 12/2008 | Kondoh | G06F 21/608 | 358/1.15 |
| 2009/0033992 A1* | 2/2009 | Ogiwara | G06F 21/608 | 358/1.15 |
| 2009/0153896 A1* | 6/2009 | Maruyama | G06F 21/608 | 358/1.14 |
| 2009/0153901 A1* | 6/2009 | Imamura | G06F 21/608 | 358/1.15 |
| 2009/0158422 A1* | 6/2009 | Tomiyasu | G06F 21/608 | 726/17 |
| 2009/0180141 A1* | 7/2009 | Takaishi | G03G 15/5075 | 358/1.15 |
| 2009/0184452 A1* | 7/2009 | Yoo | B65B 27/08 | 270/1.01 |
| 2009/0195820 A1* | 8/2009 | Sugimoto | H04N 1/00411 | 358/1.15 |
| 2009/0199193 A1* | 8/2009 | Jackson | G06F 9/5077 | 718/104 |
| 2009/0257078 A1* | 10/2009 | Sawada | G06F 21/608 | 358/1.14 |
| 2009/0310178 A1* | 12/2009 | Tomita | G06F 21/608 | 358/1.15 |
| 2009/0316189 A1* | 12/2009 | Yamauchi | G06F 21/608 | 358/1.15 |
| 2010/0128326 A1* | 5/2010 | Hiraoka | H04N 1/00408 | 358/474 |
| 2010/0134822 A1* | 6/2010 | Kimura | G06F 3/1222 | 358/1.14 |
| 2010/0182624 A1* | 7/2010 | Murakami | G06F 3/1204 | 358/1.9 |
| 2010/0185858 A1* | 7/2010 | Nishimi | H04L 63/08 | 713/168 |
| 2010/0198951 A1* | 8/2010 | Dean | G06F 9/5027 | 709/222 |
| 2010/0231963 A1* | 9/2010 | Oda | G03G 15/5012 | 358/1.15 |
| 2010/0238484 A1* | 9/2010 | Komine | G06F 3/1204 | 358/1.15 |
| 2010/0238495 A1* | 9/2010 | Sugimoto | G06F 21/608 | 358/1.15 |
| 2010/0328708 A1* | 12/2010 | Chew | G06K 15/1823 | 358/1.15 |
| 2011/0010543 A1* | 1/2011 | Schmidt | H04W 12/10 | 713/168 |
| 2011/0167425 A1* | 7/2011 | Lurie | G06F 9/5072 | 718/102 |
| 2011/0211857 A1* | 9/2011 | Mikami | G03G 15/5029 | 399/82 |
| 2011/0242555 A1* | 10/2011 | Nakajima | G06K 15/1822 | 358/1.9 |
| 2012/0036235 A1* | 2/2012 | Chan | G06F 9/5027 | 709/220 |
| 2013/0258396 A1* | 10/2013 | Fukasawa | G06F 3/12 | 358/1.15 |

FOREIGN PATENT DOCUMENTS

| | | |
|---|---|---|
| JP | 2006-146944 A | 6/2006 |
| JP | 2007-144797 A | 6/2007 |
| JP | 2009-302879 A | 12/2009 |
| JP | 2010-003006 A | 1/2010 |

OTHER PUBLICATIONS

Office Action (Notification of Reasons for Refusal) issued on Nov. 26, 2013, by the Japanese Patent Office in the corresponding Japanese Patent Application No. 2010-282848 and an English translation of the Office Action. (5 pages).

* cited by examiner

IMAGE FORMING APPARATUS

This application is based on application No. 2010-282848 filed in Japan, the contents of which are hereby incorporated by reference.

BACKGROUND OF THE INVENTION (1) Field of the Invention

The present invention relates to an image forming apparatus, such as a copier and a printer.

(2) Related Art

Conventionally, proposals have been made of methods for printing confidential documents with the use of image forming apparatuses such as copiers, printers, and fax machines.

As one example of a method for printing such confidential documents, Patent Literature (Japanese Patent Application Publication No. 2010-3006) discloses a method of utilizing authentication print jobs. More specifically, when an image forming apparatus connected to an external terminal via a network receives an authentication print job from the external terminal, the image forming apparatus does not immediately execute (print out) the authentication print job so received. Instead, the image forming apparatus first stores data for the authentication print job to a storing unit composed of a hard disk or the like. Here, note that the authentication print job is transmitted by the external terminal according to an instruction provided by a user. Following this, the user travels from the external terminal to the image forming apparatus and performs user authentication by inputting a user ID and a password from a user operation unit provided to the image forming apparatus. When user authentication is successfully completed, the image forming apparatus reads out data for the authentication print job from the storing unit, and executes (prints out) the authentication print job.

As such, when the authentication print job technology is applied, printing of authentication print job documents is executed only when user authentication is successfully performed on the image forming apparatus. This technology has an advantageous effect of avoiding the risk of printed documents being seen by others besides the user having requested for printing thereof. This effect is particularly evident in a case where a user operating an external terminal located distant from an image forming apparatus issues a request for printing a certain document with respect to the image forming apparatus. In such a case, the user has to travel to the image forming apparatus in order as to collect the output document, and there is a risk of the printed documents being exposed to others while the user is traveling towards the image forming apparatus if the printing of the document is performed automatically. The authentication print job technology eliminates such a risk, and thus, maintains the confidentiality of the documents.

When the authentication print job technology is applied, an authentication print job is executed by an image forming apparatus when the image forming apparatus has already received data for the authentication print job at a point where the user having issued the job performs input of information required for user authentication such as user ID and the like, and further, after user authentication is successfully performed. The user performs the input of necessary information from a user operation unit provided to the image forming apparatus.

However, cases may exist where the reception of data for an authentication print job is still in progress when a user is performing input of information required for user authentication with respect to the user operation unit. Such cases may arise due to network congestion taking place, the amount of data for an authentication print job being enormous, and etc.

If the reception of data for an authentication print job is still in progress at a point where the user performs input of information required for user authentication as in such cases as described in the above, the user is caused to wait in front of the image forming apparatus. In specific, the user has to wait for the completion of the reception of data and for the eventual completion of printing of the authentication print job.

However, the technology disclosed in Patent Literature 1 does not provide a structure for informing a user of the amount of time the user has to wait in front of the image forming apparatus for the completion of the reception of data for an authentication print job.

Since the amount of time required until the completion of the reception of data for an authentication print job differs according to the data amount and the like for each authentication print job, the user is caused to wait in front of the image forming apparatus without any idea of how long he/she would have to wait, even in cases where it actually takes a great amount of time until the completion of the reception of data. This is inconvenient from the user's point of view, since, if only the user were informed of the long period of time he/she would be caused to wait, the user would be able to work on other tasks and the like, instead of wasting time by waiting for a long time.

Additionally, the printing of an authentication print job is executed when a corresponding user authentication operation is successfully performed by the user. That is, user authentication needs to be successfully performed for each authentication print job. This is troublesome from the user's point of view. For instance, when the same user issues two separate authentication print jobs A and B, and the image forming apparatus receives data for the authentication print job B while executing the authentication print job A, the user has to perform a separate user authentication operation corresponding to the authentication print job B after the execution of the authentication print job A is completed.

One countermeasure for avoiding such a troublesome situation is to enable successive printing of the authentication print jobs A and B while requiring for the user to perform an input operation only once, for instance. However, this countermeasure does not provide a perfect solution. There are cases where data relating to multiple authentication print jobs are not continuously transmitted to the image forming apparatus for reasons such as network congestion. That is, the reception of data for the authentication print job B may be delayed with respect to the reception of data for the authentication print job A.

When the reception of data for the authentication print job B is delayed as in such a case, the execution of the authentication print job B is delayed accordingly. Therefore, so as to avoid others from viewing the printed documents and thus, to maintain confidentiality, the user having issued the authentication print jobs A and B is caused to wait in front of the image forming apparatus until the printing of the authentication print job B is finally completed.

Further, when the user having issued the authentication print jobs A and B is caused to wait in front of the image forming apparatus for a great amount of time, other users are unable to perform input operations for user authentication from the user operation unit for an extended period of time. This results in reduced convenience of the image forming apparatus.

In view of the above-mentioned problems, one aim of the present invention is to provide an image forming apparatus that realizes enhanced convenience in the execution of authentication print jobs while maintaining confidentiality.

SUMMARY OF THE INVENTION

The above-presented aim is achieved by an image forming apparatus that receives data for an authentication print job from an external terminal connected thereto via a network, receives a user authentication request from a user, and executes the job when the user authentication is successfully performed, the image forming apparatus comprising: a display unit; and a display control unit displaying information related to an amount of time expected to be required for the execution of the job on the display unit when the user authentication is successfully performed prior to completion of the reception of the data for the job.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF PREFERRED EMBODIMENTS

In the following, description is provided on a form of implementation of an image forming apparatus pertaining to the present invention, taking a tandem type color digital multiple function peripheral (hereinafter simply referred to as a "multifunction peripheral") as an example.

(1) Overall Structure of Multifunction Peripheral

Figure 1:
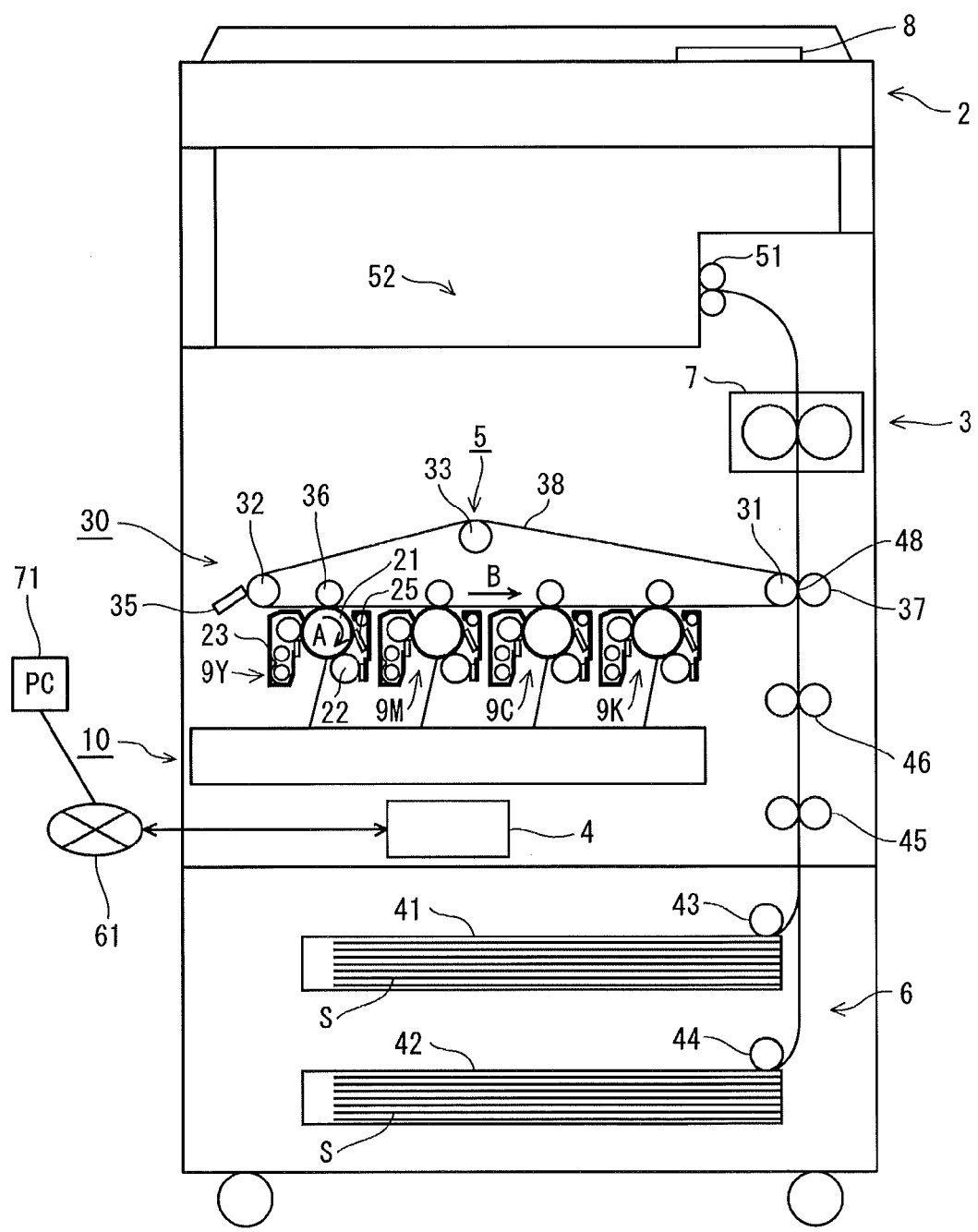
FIG. 1 is a schematic diagram illustrating the overall structure of a multifunction peripheral.

FIG. 1 is a schematic diagram illustrating the overall structure of a multifunction peripheral 1.

As illustrated in FIG. 1, the multifunction peripheral 1 includes: a scanner unit 2; a printer unit 3; and a control unit 4. The multifunction peripheral 1 is a so-called MFP, and is able to execute various jobs. Such jobs include: a copy job, where the multifunction peripheral 1 reads an image from an original document and forms an image on a recording sheet in accordance with data of the original image; and an authentication print job, where the multifunction peripheral 1 receives data for an authentication print job transmitted from an external terminal 71 via a network 61, and forms an image on a recording sheet in accordance with the data received, thereby performing printing of the image.

The scanner unit 2 is a conventional image reading device which reads an image from an original document set thereto, thereby obtaining image data.

The printer unit 3 forms an image by applying methods such as electrophotography and the like, and includes: an image forming unit 5; a paper feeder 6 for feeding recording sheets; and a fixing unit 7.

The image forming unit 5 includes: imaging units 9Y, 9M, 9C, and 9K, which respectively correspond to the reproduction colors yellow (Y), magenta (M), cyan (C), and black (B); an exposure unit 10; and an intermediate transfer unit 30.

The intermediate transfer unit 30 includes: a driving roller 31; a driven roller 32; a tension roller 33; an intermediate transfer belt 38; a cleaning blade 35; primary transfer rollers 36; and a secondary transfer roller 37. The secondary transfer roller 37 is pressed against the driving roller 31 and put into contact therewith at a secondary transfer position 48 with the intermediate transfer belt 38 in between.

The intermediate transfer belt 38 is bridged in a tensioned state supported by the driving roller 31, the driven roller 32, and the tension roller 33, and rotates in the direction indicated by the arrow B in FIG. 1.

Each of the primary transfer rollers 36 is disposed facing a corresponding photosensitive drum 21 with the intermediate transfer belt 38 in between. One photosensitive drum 21 is provided to each of the imaging units 9Y-9K.

The imaging units 9Y-9K are disposed facing the intermediate transfer belt 38. More specifically, the imaging units 9Y, 9M, 9C, and 9K are disposed in series with predetermined intervals therebetween and in the stated order from the upstream direction to the downstream direction along the intermediate transfer belt 38.

The imaging unit 9Y includes: the photosensitive drum 21, which rotates in the direction indicated by the arrow A in FIG. 1 and which functions as an image carrier, and a charger 22, a developing unit 23, and a cleaner 25 which are disposed around an outer circumferential surface of the photosensitive drum 21, or more specifically, along the rotation direction of the photosensitive drum 21. Since the rest of the imaging units, namely the imaging units 9M, 9C, and 9K, have similar structures as the imaging unit 9Y, reference signs indicating the corresponding components in the rest of the imaging units are omitted in FIG. 1. Further, a toner image of a corresponding color is formed on each photosensitive drum 21.

The paper feeder 6 includes: paper-feed cassettes 41 and 42 for accommodating recording sheets S; rollers 43 and 44 for sending out the recording sheets S one by one from the paper-feed cassettes 41 and 42, a pair of transfer rollers 45 for transferring a recording sheet S having been sent out from the paper-feed cassettes 41 and 42; and a pair of timing rollers 46 for adjusting the timing at which the recording sheet S is sent toward the secondary transfer position 48.

The fixing unit 7 includes a heater (undepicted), and is thereby maintained at a predetermined fixing temperature.

The control unit 4 generates a drive signal for driving the exposure unit 10, and drives the exposure unit 10 by using the drive signal so generated. Accordingly, the exposure unit 10 emits light beams of the respective colors Y-K, and performs exposure-scanning on the photosensitive drum 21 of each of the imaging units 9Y-9K.

Prior to being subjected to the exposure-scanning, the photosensitive drum 21 of each of the imaging units 9Y-9K is similarly electrically-charged by the charger 22. Thus, an electrostatic latent image is formed on each photosensitive drum 21 by exposure to the light beams. Subsequently, the electrostatic latent image having been formed on each photosensitive drum 21 is developed with the use of developer including toner, which is enclosed in the developing unit 23. Thus, a toner image is formed on each photosensitive drum 21. Following this, the toner image formed on each photosensitive drum 21 is transferred onto the intermediate transfer belt 38 by a corresponding one of the primary transfer rollers 36 (primary transfer). Here, the forming of images of the respective colors onto the intermediate transfer belt 38 is performed at shifted timings so that the toner images of the four colors are transferred onto the same position on the intermediate transfer belt 38 and overlap at the position.

In accordance with the timing at which the forming of images as described in the above is performed, the paper feeder 6 feeds a recording sheet S via the pair of timing rollers 46. The recording sheet S is transferred while being held between the intermediate transfer belt 38 and the secondary transfer roller 37, both of which are driven to rotate. Accordingly, the toner images of the respective colors on the intermediate transfer belt 38 are transferred onto the recording sheet S by the secondary transfer roller 37 (secondary transfer).

When the secondary transfer is completed, the recording sheet S is transferred to the fixing unit 7, where the toner image is fixed onto the recording sheet S by heat and pressure being applied thereto. Following this, the recording sheet S is ejected via a pair of eject rollers 51, and is accommodated in a paper eject tray 52. Note that the residual toner remaining on the intermediate transfer belt 38 after the toner images are transferred onto the recording sheet S at the secondary transfer position 48 is removed by the cleaning blade 35.

In the above, description is provided on a case where forming of a full color image (of the four colors: Y-K) is executed. However, the multifunction peripheral 1 may form a monochrome image of one of the colors Y-K. That is, for instance, the forming of a monochrome image of color K, can be executed selectively. When a monochrome image is to be formed, only the image unit corresponding to the color to be reproduced is driven among the imaging units 9Y-9K. For instance, when forming a monochrome image of color K on a recording sheet S, the imaging unit 9K corresponding to the color K is driven, a toner image of color K is transferred onto the intermediate transfer belt 38 by the imaging unit 9K, and secondary transfer is performed of the toner image of color K on the intermediate transfer belt 38 onto the recording sheet S.

A user operation panel 8 is provided to the scanner unit 2 at a front side thereof, and at a location to which users have easy access. The user operation panel 8 is provided with a group of keys which are operated by the user. Such keys include: a key for receiving job selections from users; a ten-key pad for inputting a user ID and a password during user authentication as well as for inputting the number of copies to be made during a copy job and the like; a copy start key for instructing the multifunction peripheral 1 to start copying; a key for receiving selection of copy magnification ratio, sheet size and the like from the users; and a key for receiving the selection of image forming modes, such as color and monochrome, from the users. Further, in addition to such keys, a touch-panel type liquid crystal display 81 (illustrated in FIG. 2) is provided to the user operation panel 8. The liquid crystal display 81 displays a screen including various messages and also receives touch input performed by the users. Further, the information input by the user via from user operation panel 8 is transmitted to the control unit 4.

(2) Structure of the Control Unit 4

Figure 2:
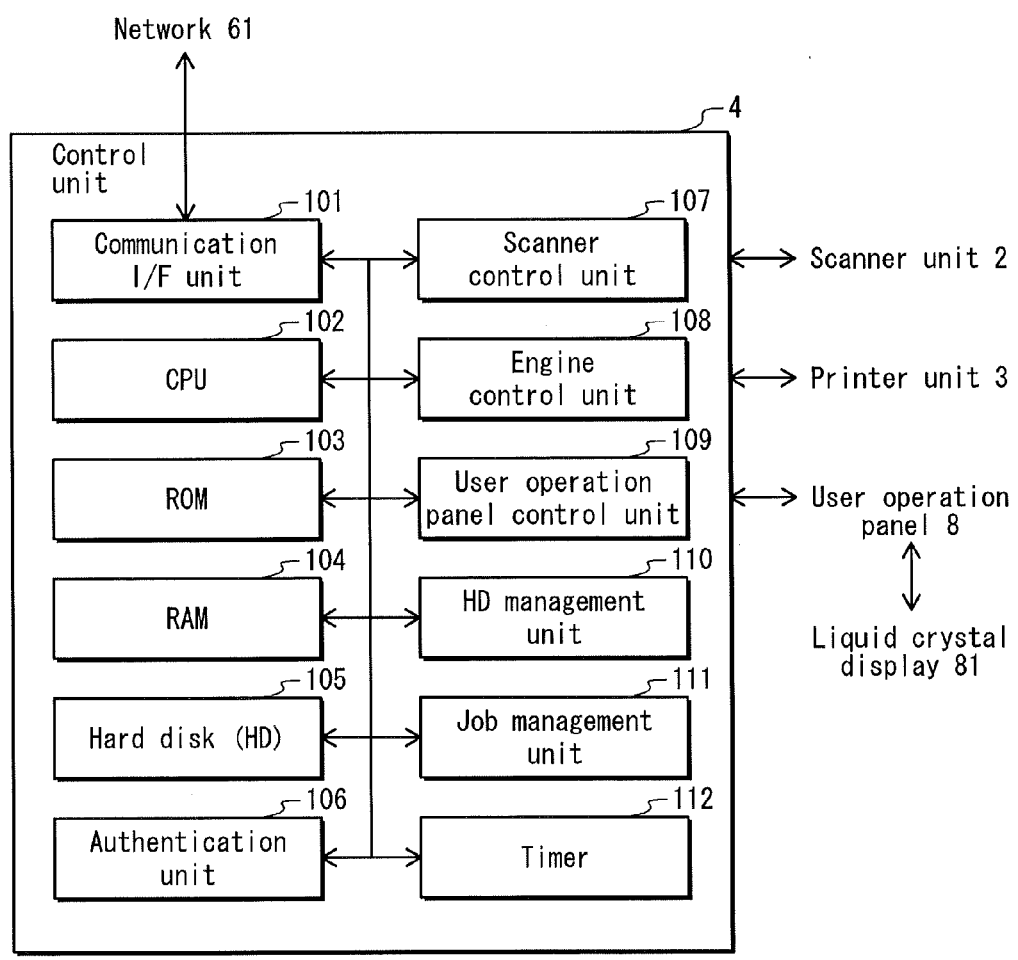
FIG. 2 is a block diagram illustrating the schematic structure of a control unit provided in the multifunction peripheral.

FIG. 2 is a block diagram illustrating the schematic structure of the control unit 4.

As illustrated in FIG. 2, the control unit 4 includes, as its main components: a communication interface (I/F) unit 101; a CPU 102; a ROM 103; a RAM 104; a hard disk (HD) 105; an authentication unit 106; a scanner control unit 107; an engine control unit 108; a user operation panel control unit 109; a HD management unit 110; a job management unit 111; and a timer 112. Here, each of such components is able to perform transmission/reception of signals and data with the rest of the components.

The CPU 102 reads out a necessary program from the ROM 103, and causes the program to smoothly execute various jobs such as a copy job and an authentication print job.

The ROM 103 stores therein a control program and the like related to the reading of the original documents, the forming of images, and etc. Such control programs and the like are provided for the execution of various jobs. The RAM 104 is accessed by the CPU 102 as a work area.

The HD 105 stores data such as image data read by the scanner unit 2 and data for authentication print jobs. Here, note that the storing unit is not limited to the hard disk, and other memories and the like capable of storing data may be alternatively used.

The HD management unit 110 writes (stores) data to the HD 105, reads out data from the HD 105, and also performs management of the data (files) stored in the HD 105.

The scanner control unit 107 controls the operation of the scanner unit 2, and the engine control unit 108 controls the operation of the printer unit 3.

The communication I/F unit 101 is an interface such as a LAN card and a LAN board for establishing connection with a LAN, which corresponds to the network 61 in this case. The communication I/F unit 101 receives data for authentication print jobs transmitted from the external terminal 71, which is a personal computer (PC) or the like, via the network 61.

Figure 3:
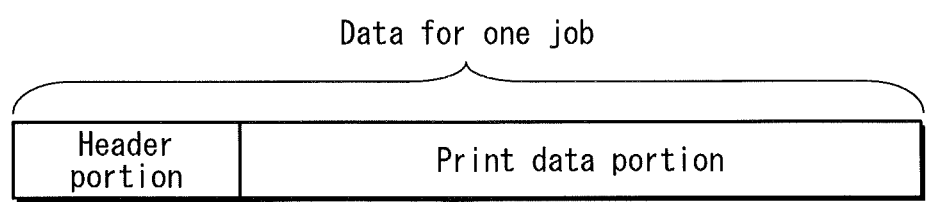
FIG. 3 is a schematic diagram illustrating an example of the data structure of an authentication print job.

FIG. 3 is a schematic diagram illustrating an example of the data structure of an authentication print job.

As illustrated in FIG. 3, data for an authentication print job is divided into a header portion and a print data portion.

The header portion of an authentication print job includes information indicating: job type (information indicating that the job is an authentication print job); a job ID composed of a unique identifier distinguishing the job from other jobs;

and a user ID and a password of the user having issued the job. Further, in addition to such information, the header portion also includes information indicating: a total data amount of the job (for instance, in units of megabytes, and etc.); and the conditions under which the job is to be executed. More specifically, such job execution conditions include: the total number of pages of print data included in the print data portion in printed form; the number of copies to be made; paper size to be used in printing; the type of image processing mode to be applied; and the type of printing mode to be applied. Here, the types of image processing mode include an image processing mode for printing letters, a mode for printing figures, a mode for printing photographs, and etc., whereas the types of printing mode include a color printing mode, a monochrome printing mode, and etc.

The print data portion contains data (print data) corresponding to the images to be printed out, in units of pages. More specifically, the print data are data formed using PDL (page description language). In the present embodiment, data for an authentication print job is received by the multifunction peripheral 1 in the order of first the header portion and then the print data portion. Further, before the reception of an entirety of data for an authentication print job is completed, the multifunction peripheral 1 refers to the information included in the header portion and thereby determines: (i) that the job is an authentication print job; (ii) the total data amount of the job; and (iii) the job execution conditions of the job, such as the number of pages of the print data in printed form and whether the printing of the job should be performed in color or in monochrome.

The communication I/F unit 101 transmits data for an authentication print job to the job management unit 111. Here, when print data included in an authentication print job is in the PDL format, the print data is converted into a format suitable for printing such as the raster data format by a print controller unit (undepicted) provided to the communication I/F unit 101 prior to the transmission thereof to the job management unit 111.

The job management unit 111 temporarily stores data for an authentication print job transmitted from the communication I/F unit 101 to an internal memory (undepicted: a DRAM or the like). When the reception of data for an authentication print job is completed, the job management unit 111 notifies the HD management unit 110 of the completion, and instructs the HD management unit 110 to store the data temporarily stored to the job management unit 111 to the HD 105.

Figure 4:
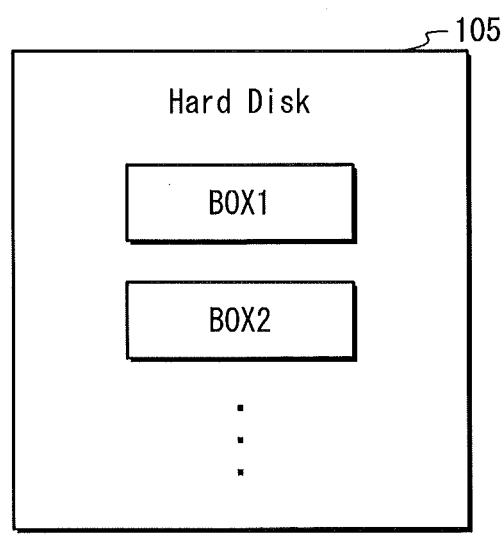
FIG. 4 illustrates an example where boxes are provided to a hard disk of the control unit.

As illustrated in FIG. 4, the HD 105 is provided in advance with data storage areas (hereinafter referred to as "boxes"), each of which is uniquely allocated to a corresponding one of the users of the multifunction peripheral 1. Each of the boxes 1, 2, . . . is provided with a user ID and a password for identifying the user to whom the box is allocated to.

The job management unit 111 causes the HD management unit 110 to store data for an authentication print job (which includes the data in the header portion and the data in the print data portion (raster data), in an associated state) to a box provided with the same user ID and password as the user ID and password included in the header portion of the data.

As described in the following, when user authentication is successfully performed, data for an authentication print job stored in the corresponding box of the HD 105 is read out from they box, and supplied for the execution of the authentication print job.

The job management unit 111 registers various jobs, such as copy jobs and authentication print jobs, to a printing queue (undepicted) one by one and in sequential order. When a job is registered to the printing queue, the job management unit 111 instructs the engine control unit 108 to execute the job.

The registration of jobs to the printing queue, particularly when the job is a copy job, is performed when the copy start key on the user operation panel 8 is pressed down by a user. On the other hand, when the job is an authentication print job, the registration thereof to the printing queue is performed when a job entry instruction is issued by the user operation panel control unit 109 following the successful completion of user authentication, as description is provided in the following.

The engine control unit 108, when instructed to execute a copy job, instructs the scanner control unit 107 to perform reading of the original document and thereby obtains image data of the original document from the scanner unit 3, and further causes the printer unit 3 to execute image forming in accordance with the image data so obtained.

On the other hand, the engine control unit 108, when instructed to execute an authentication print job, reads out data for the authentication print job from the corresponding box (a box having a user ID corresponding to the user ID of the user having issued the authentication print job) of the HD 105. Accordingly, the engine control unit 108 causes the printer unit 3 to execute image forming in accordance with the information included in the header portion and the print data included in the print data portion of the data.

Figure 5:
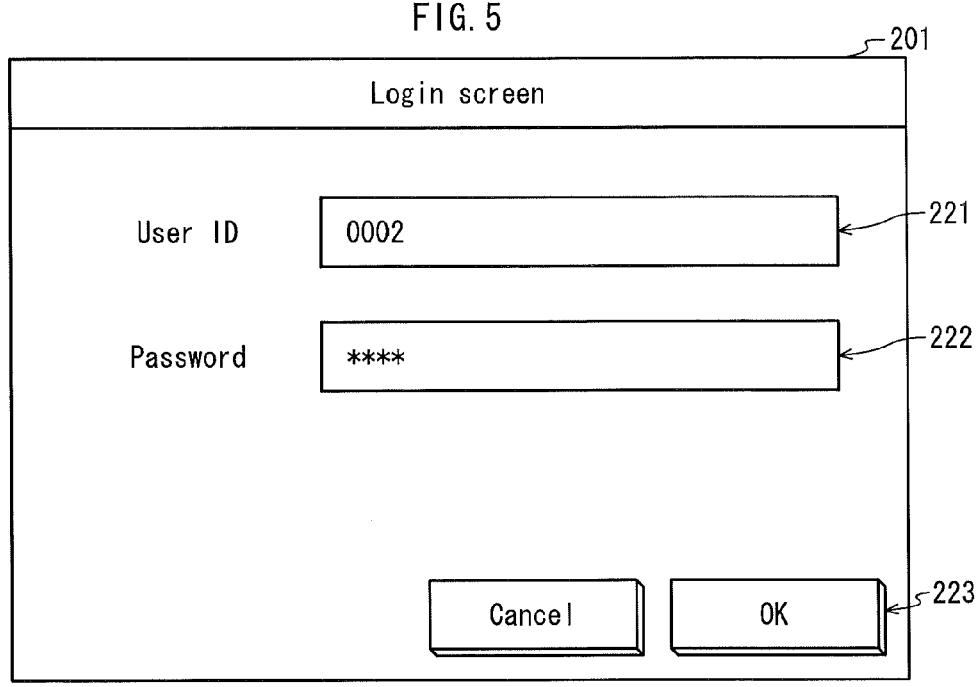
FIG. 5 is a display example of a login screen.

The authentication unit 106 performs user authentication of users who attempt to use (access) the own device (the multifunction peripheral 1). More specifically, the authentication unit 106 is provided in advance with authentication information indicating combinations of a user ID and a password that are required for user authentication of users who are permitted access to the own device. More specifically, the authentication unit 106 holds a combination of a user ID and a password for each user who is permitted access to the own device. The authentication unit 106 determines that a user is an access-permitted user and that user authentication has been successfully performed when a user ID and a password that a user attempting to access the own device inputs from a login screen 201 (to be described in the following: FIG. 5) displayed on the liquid crystal display 81 of the user operation panel 8 matches one of the combinations of a user ID and a password included in the authentication information. On the other hand, when a user ID and a password input by a user does not match any of the combinations of a user ID and a password included in the authentication information, the authentication unit 106 determines that the user is not an access-permitted user and that user authentication has failed.

In addition to this, the authentication unit 106 also has a function of performing user authentication required for the execution of authentication print jobs. More specifically, the authentication unit 106 judges whether or not a user ID and a password included in the header portion of an authentication print job transmitted from the external terminal 71 respectively match the user ID and the password that a user has input from the login screen 201 displayed on the liquid crystal display 81 of the user operation panel 8. When judging that the user IDs and the passwords match, the authentication unit 106 determines that user authentication has been successfully performed, whereas when judging that the user IDs and/or the passwords do not match, user authentication unit 106 determines that user authentication has failed.

Here, note that user authentication method is not limited to the method described in the above, where a user is required to perform manual input of his/her user ID and the like. For instance, user authentication may be performed by providing the multifunction peripheral 1 with an authentication device such as an IC card authentication device or a fingerprint/finger vein authentication device, and having users perform predetermined input operations with respect to such authentication devices. The same applies to user authentication performed for authentication print jobs, and other authentication methods may be applied provided that determination can be made that a user having issued an authentication print job from the external terminal 71 and a user requesting for user authentication for the execution of an authentication print job on the multifunction peripheral 1 having received the authentication print job is the same user.

The user operation panel control unit 109 receives user operations (pressing down of keys and touch input) performed by a user with respect to the keys provided to the user operation panel 8. More specifically, when a user operation is performed with respect to one of the keys, the user operation panel control unit 109 notifies the CPU 102 of information input through the user operation. Accordingly, the CPU 102 is able to instruct such units as the scanner control unit 107 and the engine control unit 108 to execute processing corresponding to the key to which the user operation has been performed. For instance, if the user operation has been performed with respect to the copy start key, the CPU 102 instructs the scanner control unit 107 and the engine control unit 108 to commence copying.

In addition to this, when the two following conditions are both satisfied, the user operation panel control unit 109 instructs the job management unit 111 to register an authentication print job to the printing queue. That is, (i) when user authentication for an authentication print job has been successfully performed, and (ii) when data for the authentication print job is already stored in the HD 105, the authentication print job is registered to the printing queue. Detailed description concerning such conditions is provided in the following.

Figure 6:
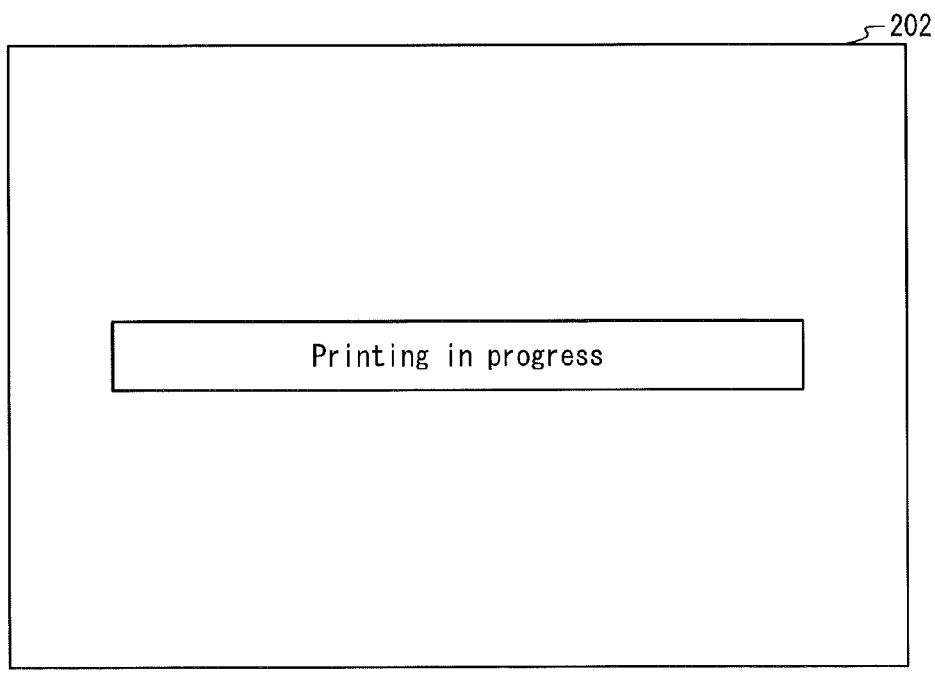
FIG. 6 is a display example of a print-in-progress screen.
Figure 7:
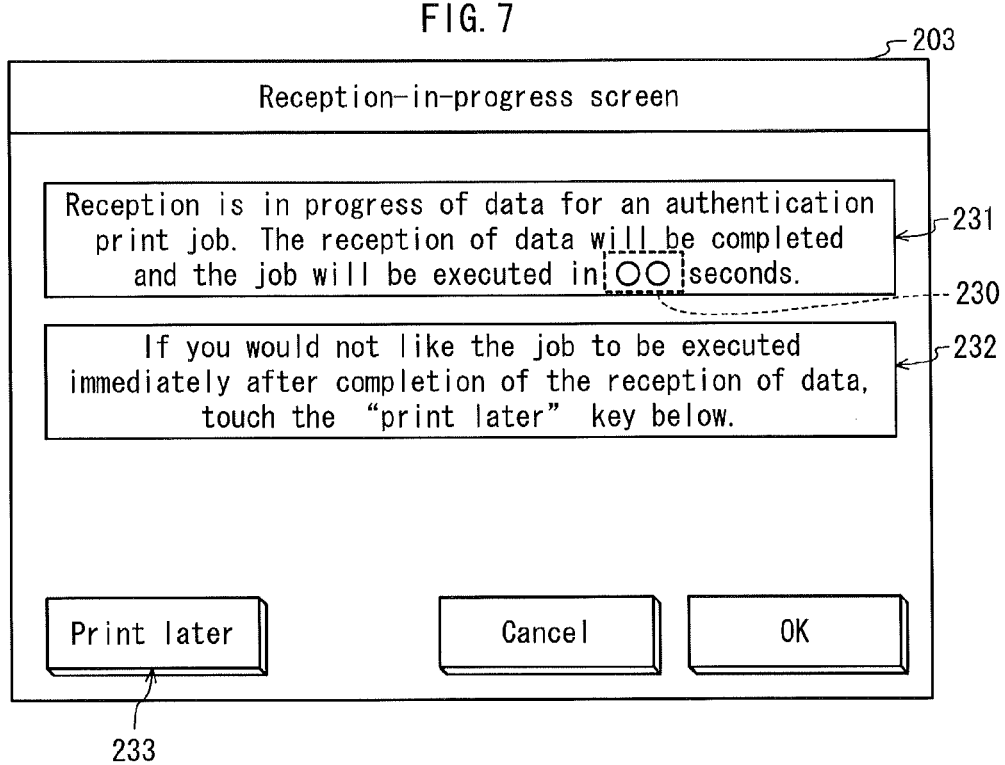
FIG. 7 is a display example of a reception-in-progress screen.
Figure 8:
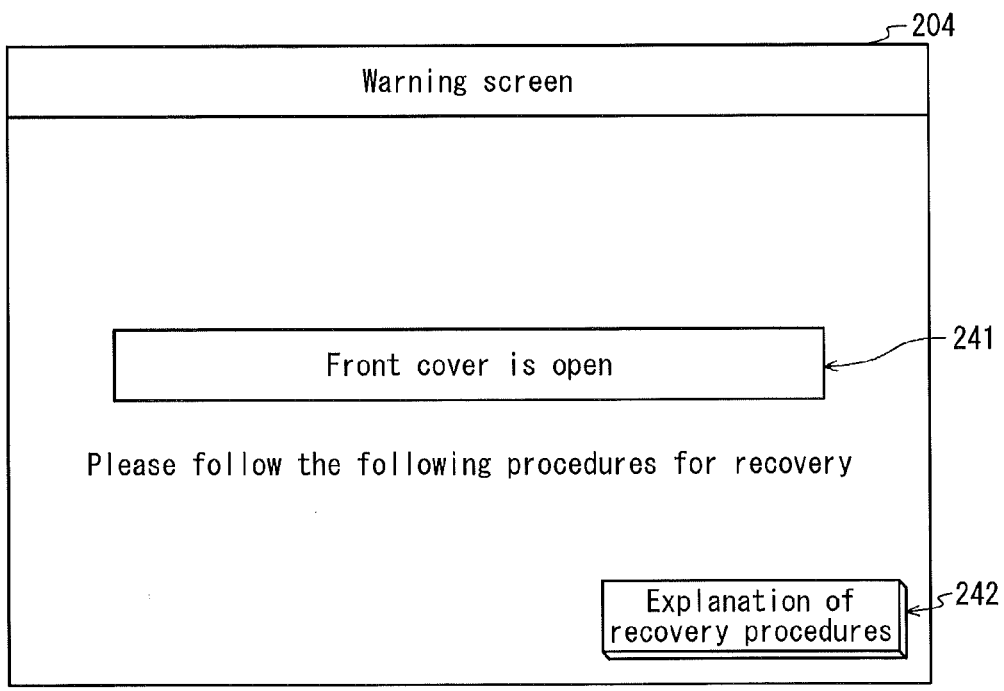
FIG. 8 is a display example of a warning screen.

Further, the user operation panel control unit 109 performs display control of a screen displayed on the liquid crystal display 81 of the user operation panel 8. Examples of the screen displayed include: the login screen 201 as illustrated in FIG. 5; a print-in-progress screen 202 as illustrated in FIG. 6; a reception-in-progress screen 203 as illustrated in FIG. 7; and a warning screen 204 as illustrated in FIG. 8.

The login screen 201 is a screen for performing user authentication of a user attempting to access the own device, and has a user ID entry field 221 and a password entry field 222 as illustrated in FIG. 5. The user is able to select an entry field by touching a display area corresponding to the desired entry field, and perform manual input of a user ID or a password in the selected entry field by using the ten-key pad and the like provided on the user operation panel 8.

When input of a user ID and a password has been performed, and further, when an OK key 223 is touched by the user, the authentication unit 106 performs user authentication. When user authentication is successfully completed, the user logs in to the multifunction peripheral 1. Note that, once logged in, the user is able to log out by performing predetermined user operations.

The user operation panel control unit 109 switches the screen displayed from the screen having been previously displayed to the login screen 201 when one of such conditions as provided in the following is satisfied. That is, the screen displayed is switched to the login screen, for instance, when the power of the multifunction peripheral 1 is turned on, when execution of a job has been completed, when user input operations are not performed for a predetermined period of time, or when a user has logged out.

The print-in-progress screen 202 illustrated in FIG. 6 is a screen which is displayed while the execution of the image forming by the printer unit 3 is in progress.

The reception-in-progress screen 203 illustrated in FIG. 7 is a screen which is displayed when user authentication has been performed and successfully completed during reception of data for an authentication print job. The reception-in-progress screen 203 includes: a first message display field 231; a second message display field 232; and a "print later" key 233.

The first message display field 231 displays a message indicating that the reception of data for an authentication print job corresponding to an authenticated user is now in progress and a message indicating the number of seconds remaining until the completion of the reception of data for an authentication print job and the execution of the authentication print job. The "number of seconds remaining" as referred to here corresponds to an estimated amount of time required until the execution of an authentication print job from the present point in time, or in other words, the amount of time the user will have to wait until the execution of the authentication print job. In a display area 230 indicating the number of seconds remaining, firstly, a value indicating time (number of seconds) obtained through estimation processing of the time remaining as described in the following is displayed, and following this, display is performed such that the value displayed is changed every second. That is, the value displayed in the display area 230 switches every second to a value obtained by decrementing, or counting down from, the value indicating time initially displayed by one second. The decrementing is performed according to the time measured by the timer 112.

An authenticated user is able to acknowledge the amount of time he/she would have to wait until the execution of an authentication print job that he/she has issued by viewing the display area 230 indicating the number of seconds remaining. By acknowledging the time he/she has to wait, the user is provided with a choice of actions to take during the time remaining. For instance, when considering that the time he/she has to wait is comparatively short, the user may remain waiting in front of the multifunction peripheral 1. On the other hand, when considering that the time he/she has to wait is comparatively long, the user may leave the multifunction peripheral 1 temporarily to work on other tasks, and then return once again to the multifunction peripheral 1 immediately before the execution of the authentication print job.

In the application of conventional technology, a user is kept waiting in front of the multifunction peripheral 1 not having any idea of how long he/she would have to wait until the execution of an authentication print job, especially when the user does not want the printed documents exposed to others (that is, when the user desires to maintain confidentiality of the authentication print job). Further, the actual amount of time the user is kept waiting may be comparatively long or may be comparatively short. By performing displaying of the number of seconds remaining as in the present embodiment, the user is able to choose either to wait in front of the multifunction peripheral 1 or to leave the multifunction peripheral 1 temporarily by making an assumption of the time he/she would have to wait according to the displayed number of seconds. Thus, the multifunction peripheral 1 pertaining to the present embodiment realizes enhanced convenience by providing the user with a choice of actions while maintaining confidentiality.

The second message display field 232 displays a message prompting an authenticated user to touch the "print later" key 233 when the authenticated user does not desire for an authentication job that he/she has issued to be executed immediately following the completion of the reception of data.

In specific, the "print later" key 233 is a key for prohibiting the immediate execution of an authentication print job following the completion of the reception of data for the authentication print job. Basically, when user authentication is successfully performed during the reception of data for an authentication print job, the authentication print job is executed after the elapse of the number of seconds remaining displayed as described in the above. However, exceptionally, when the "print later" key 233 is touched, the execution of the authentication print job is prohibited until the user logs in once more after having logged out once.

For instance, when a user, after viewing the display of the time remaining and deciding that the he/she would have to wait too long, desires to leave the multifunction peripheral 1 after logging out, and further, chooses not to return to the multifunction peripheral 1 even after the elapse of the time displayed, the user can touch the "print later" key 233 preemptively. By touching the "print later" key 233, an authentication print job issued by the user is not executed immediately following the completion of the reception of data for the authentication print job. Thus, the confidentiality of the authentication print job is maintained even if the user does not return to the multifunction peripheral 1.

Note that here, an authentication print job whose execution has been prohibited remains stored in the corresponding box of the HD 105 (or in other words, is not registered to the printing queue). However, the authentication print job can be executed when the user logs in to the multifunction peripheral 1 once again after having logged out once.

The warning screen 204 illustrated in FIG. 8 includes a warning display field 241 and a recovery procedure explanation key 242.

The warning display field 241 displays messages for notifying the user of problems that have occurred with the multifunction peripheral 1, especially those which disable the execution of image forming (jobs). Such problems include: a case where openable/closable exterior covers provided to the multifunction peripheral 1, for instance the front cover or the side cover, are in an open state; a case where a paper jam has occurred inside the multifunction peripheral 1; and a case where the replacement or refilling of the developer including toner in the developing unit 23 is necessary.

The recovery procedure explanation key 242 is a key for switching the display to a recovery procedure explanation screen (undepicted), where display is performed of illustrations or the like explaining recovery procedures for resolving the problems having occurred. When the user touches the recovery procedure explanation key 242, the screen displayed is switched to the recovery procedure explanation screen. The recovery procedure explanation screen informs the user of the problem that has occurred to the multifunction peripheral 1 and the recovery method to be taken to resolve the problem. Here, note that the detection of a problem and a recovery method to be applied to a problem is performed by detection units provided to the multifunction peripheral 1, such as a sensor for detecting the opening/closing of covers and a sensor for detecting jammed paper.

As described in the above, the screen displayed on the liquid crystal display 81 is switched to the warning screen 204 from the screen which has been previously displayed when such problems as described in the above occur. When such problems are resolved, the screen displayed is switched to another screen, for instance, a top screen (undepicted) for receiving input operations, such as an instruction for the execution of a job other than an authentication print job, from the user.

In the description provided in the above, units such as the authentication unit 106, the scanner control unit 107, the engine control unit 108, the user operation panel control unit 109, the HD management unit 110, and the job management unit 111 have been provided separately from the CPU 102. However, the present invention is not limited to this. For instance, a single CPU may be provided having a structure including modules respectively executing the functions of the authentication unit 106, the scanner control unit 107, the engine control unit 108, the user operation panel control unit 109, the HD management unit 110, and the job management unit 111.

Figure 9:
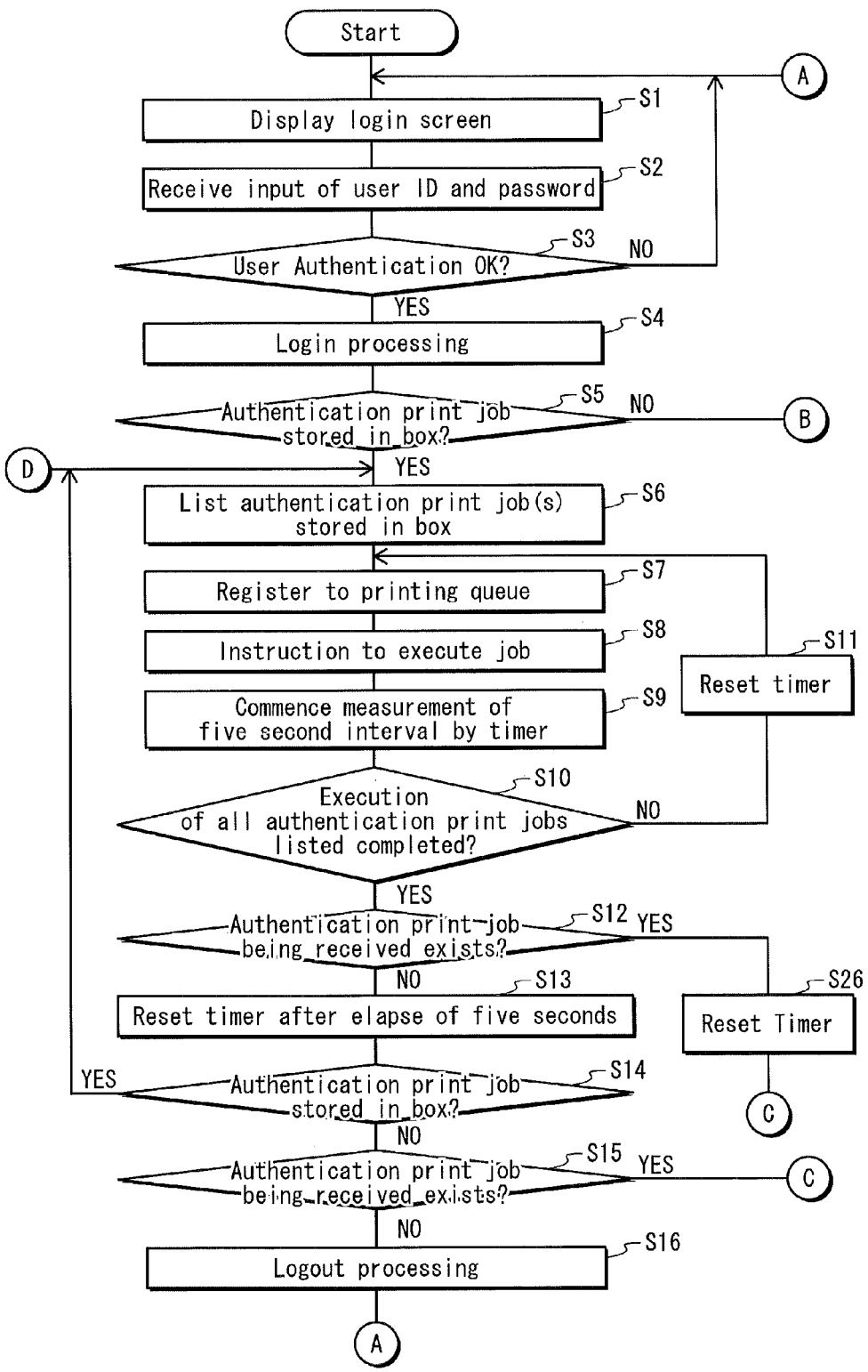
FIG. 9 is a first part of a flowchart illustrating processing executed by the control unit when an authentication print job is received.
Figure 10:
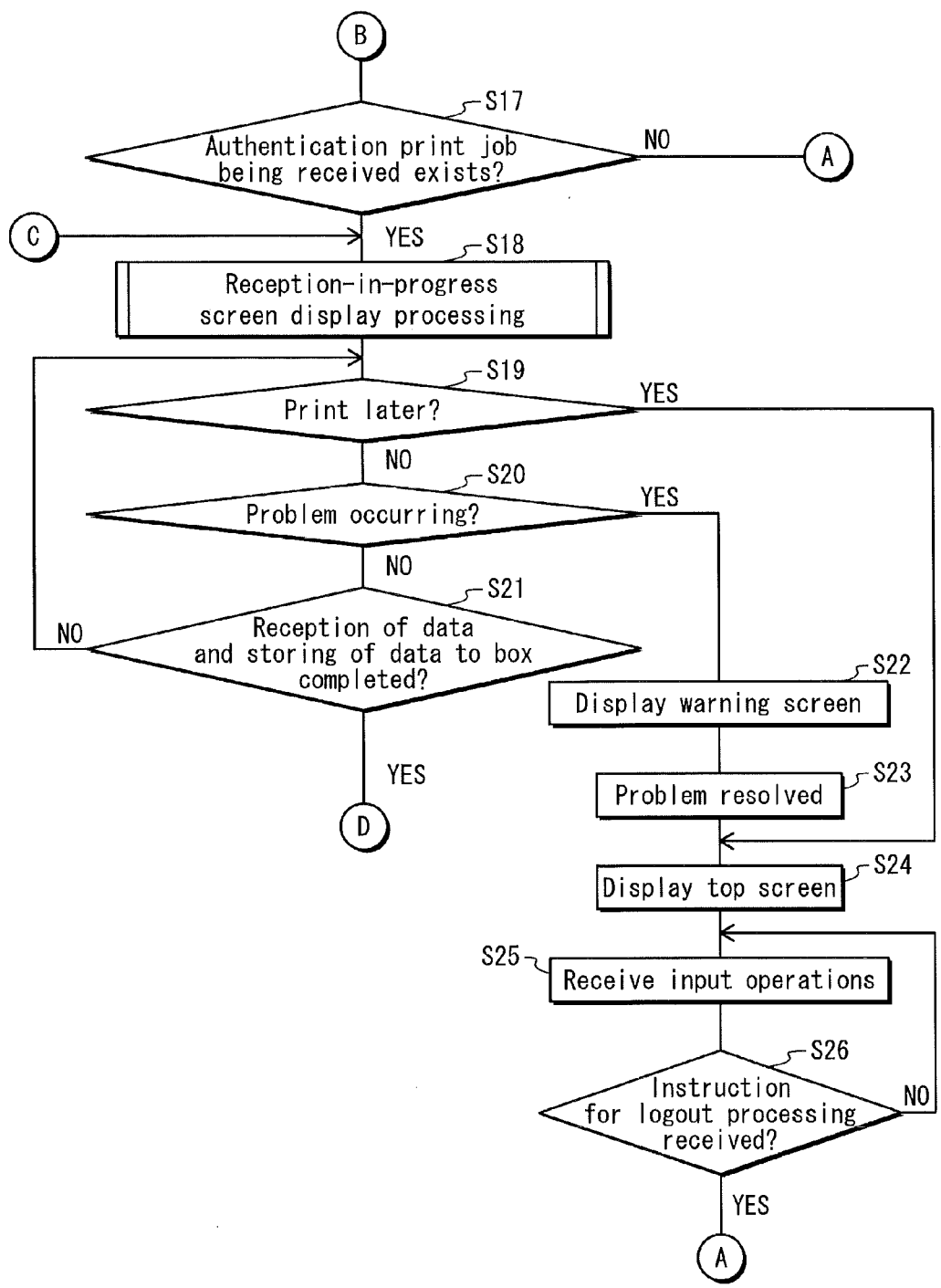
FIG. 10 is a second part of the flowchart illustrating processing executed by the control unit when an authentication print job is received.
Figure 11:
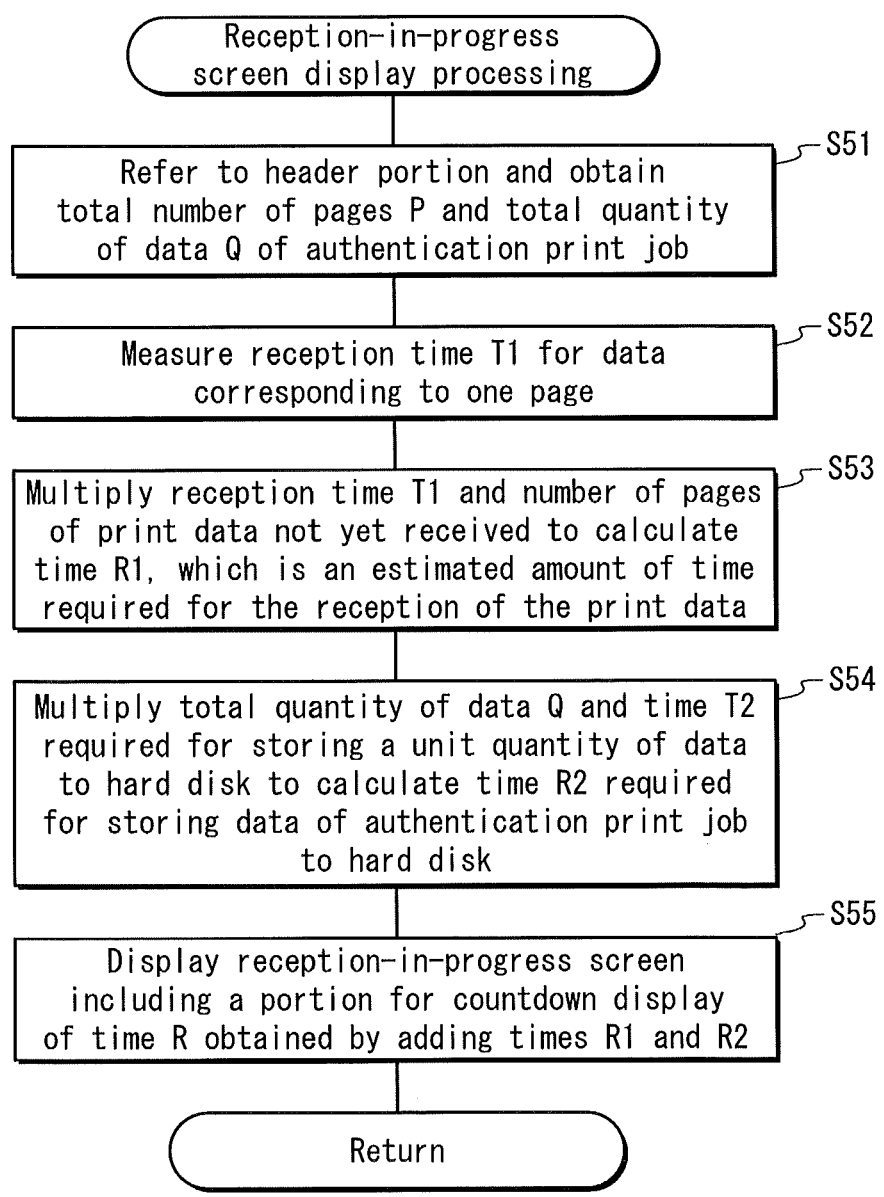
FIG. 11 is a flowchart illustrating subroutines of a reception-in-progress screen display processing.

FIGS. 9-11 are flowcharts each illustrating processing to be executed by the control unit 4 when receiving an authentication print job. Further, FIGS. 12-15 each illustrate a command sequence in the control unit 4 when receiving an authentication print job.

In the following, explanation is firstly provided of the flowcharts in FIGS. 9-11, and subsequently, explanation is provided of the examples of command sequences illustrated in FIGS. 12-15.

As illustrated in FIG. 9, the control unit 4 causes the liquid crystal display 81 of the user operation panel 8 to display the login screen 201 (FIG. 5) (Step S1). The control unit 4 receives, from a user, input of a user ID and a password (a user authentication request) from the login screen 201 (Step S2).

Accordingly, the control unit 4 performs user authentication according to the user ID and the password so input (Step S3). In specific, user authentication is performed by the authentication unit 106 according to the method as described in the above.

When judging that user authentication has failed ("NO" in Step S3), the processing by the control unit 4 returns to Step S1, and the login screen 201 for receiving input of an user ID and the like is displayed once again.

In contrast, when judging that user authentication has succeeded ("YES" in Step S3), the control unit 4 performs login processing for enabling the user to log in to the multifunction peripheral 1 (Step S4). Subsequently, the control unit 4 judges whether or not data for an authentication print job that the authenticated user has issued from the external terminal 71 is stored in the HD 105 (Step S5).

This judgment is made by first specifying a box (hereinafter referred to as an "authenticated box") provided with the same user ID and the same password as input for user authentication, among the boxes provided to the HD 105, and further determining whether or not data for an authentication print job, whose header portion includes the same user ID and the same password as described in the above, is already stored in the authenticated box so specified. Note that, since the authenticated box as referred to in the above is a box exclusively allocated to the authenticated user, a judgment may be made that an authentication print job issued by the authenticated user is stored in the authenticated box when an authentication print job is stored in the authenticated box, for instance. That is, the above-described determination based on a user ID and a password included in the header portion of an authentication print job need not be performed.

When judging that data for an authentication print job issued by the authenticated user is stored in the authenticated box ("YES" in Step S5), "listing" is performed of authentication print jobs stored in the authenticated box (Step S6). Here, the "listing" of an authentication print job stored in the authenticated box refers to processing where an authentication print job is uniquely specified by reading out the job ID included in the header portion of data for an authentication print job. Note that, at this point, when multiple authentication print jobs are stored in the authenticated box, listing is performed of a job ID for each of the multiple authentication print jobs.

Subsequently, the control unit 4 registers an authentication print job that has been listed to the printing queue (only one authentication print job is registered to the printing queue, even when multiple authentication print jobs have been listed) (Step S7), and further, the control unit 4 issues an instruction for execution of the authentication print job so registered (Step S8). Here, more specifically, the engine control unit 108 reads out data for the authentication print job to be executed from the authenticated box, transmits the data to the printer unit 3, and instructs the printer unit 3 to execute the authentication print job by utilizing the data. Accordingly, the printer unit 3 executes the authentication print job.

At the same time as issuing an instruction for execution of an authentication print job, the control unit 4 causes the timer 112 to commence measurement of a five second interval (Step S9).

Following this, the control unit 4 judges whether or not an instruction for execution has been issued for all of the authentication print jobs having been listed (Step S10). This judgment is made according to whether or not an authentication print job which has been listed but which has not yet been registered to the printing queue is remaining.

When only one authentication print job had been originally listed, the control unit 4 judges that instruction for execution has been issued for all of the authentication print jobs at this point ("YES" in Step S10), and processing proceeds to Step S12 with the measurement of the five second interval in progress.

In contrast, when the control unit 4 judges that instruction for execution has not been issued for all of the listed authentication print jobs, particularly in a case where multiple authentication print jobs have been listed ("NO" in Step S10), the measurement of the five second interval is reset (set to zero once again) (Step S11), and processing returns to Step S7.

When performing the processing in Step S7 once again returning from Step S10, the control unit 4 performs registering (overwriting) of a subsequent authentication print job to the printing queue when the engine control unit 108 outputs a signal indicating the capability of the printer unit 3 of executing a subsequent authentication print job.

More specifically, in the present embodiment, when multiple authentication print jobs are to be sequentially executed, the engine control unit 108 monitors the status of execution of an authentication print job by the printer unit 3. The above-mentioned signal is output by the engine control unit 108 when the execution of an authentication print job has almost been completed and when the printer unit 3 is ready for the execution of a subsequent authentication print job. Further, configuration is made such that, when this signal is output, the control unit 4 registers, to the printing queue, one of the listed authentication print jobs that has not yet been registered to the printing queue.

Here, the printer unit 3 becomes ready for the execution of a subsequent authentication print job, for instance, when the forming of images for a present authentication print job on the photosensitive drums 21 has been completed, when feeding of a certain number of recording sheets S required in the execution of a present authentication print job has been completed, and etc.

When a subsequent authentication print job is registered to the printing queue (Step S7), the control unit 4 issues an instruction for execution of the subsequent authentication print job (Step S8), and further, causes the timer 112 to commence the measurement of the five second interval (Step S9).

The processing in Steps S7 through S11 are repeatedly executed until it is finally judged that instruction for execution has been issued for all of the authentication print jobs that have been listed. As such, in a case where multiple authentication print jobs have been listed, an operation is repeatedly performed where the printing queue is overwritten (updated) with a subsequent authentication print job when the subsequent authentication print job becomes executable following the execution of a present authentication print job. Thus, the authentication print jobs having been listed are sequentially executed one by one.

When the control unit 4 judges that instruction for execution has been issued for all of the authentication print jobs ("YES" in Step S10), processing proceeds to Step S12 with the measurement of the five second interval in Step S9 in progress.

In Step S12, the control unit 4 judges whether or not another authentication print job whose data is currently being received exists.

When judging that another authentication print job whose data is currently being received exists ("YES" in Step S12), the control unit 4 resets the measurement of the five second interval (Step S26), and processing proceeds to Step S18. Explanation concerning the processing performed in Step S18 is provided in the following.

In contrast, when judging that another authentication print job whose data is currently being received does not exist ("NO" in Step S12), the control unit 4 waits until five seconds have elapsed since the commencement of the measurement of the five second interval by the timer 112 and resets the timer 112 when five seconds have elapsed (Step S13). Further, when five seconds have elapsed, the control unit 4 judges whether or not data for another authentication print job is stored in the authenticated box at the present point (Step S14).

A case where data for another authentication print job is stored in the authenticated box at the present point occurs when data for an authentication print job has been received and stored to the authenticated box during the processing in Steps S6-S14. In such a case ("YES" in Step S14), processing returns to Step S6 and the processing in Steps S6-S14 is performed with respect to another authentication print job. Accordingly, another authentication print job is executed.

In contrast, when data for another authentication print job is not stored in the authenticated box ("NO" in Step S14), the control unit 4 judges whether or not another authentication print job whose data is currently being received exists at the present point (Step S15). A case where another authentication print job whose data is currently being received exists at the present point occurs when reception of data for an authentication print job has been commenced at a time point during the processing in Steps S6-S14 and during the five second interval, or more specifically, after a negative judgment is made in Step S12, and further, when the reception of data is still in progress at the present point.

When judging that another authentication print job whose data is currently being received does not exist ("NO" in Step S15), the control unit 4 performs logout processing for causing the user to log out from the multifunction peripheral 1 (Step S16), and processing returns to Step S1.

In this case, since an authentication print job to be executed at the present point does not exist, the control unit 4 invalidates login processing performed with respect to an authentication print job having been executed (performs logout processing), and switches the screen displayed on the liquid crystal display 81 to the login screen 201 (Step S1) for receiving a login request from a user.

As such, logout processing is performed when reception of data for another authentication print job is not in progress when a judgment of "NO" is made in Step S15, or that is, when five seconds have elapsed since the commencement of the measurement of the five second interval by timer 112. Hence, when reception of data for an authentication print job is commenced following this point, another login processing (successful user authentication) is required for the printing of the authentication print job. In other words, when reception of data for an authentication print job is commenced following the elapse of the five second interval, the execution of the authentication print job is prohibited until another login processing is performed following logout processing.

When the control unit 4 judges that an authentication print job whose data is currently being received exists ("YES" in Step S15), processing proceeds to Step S18. Explanation concerning the processing performed in Step S18 is provided in the following.

When the control unit 4 judges that data for an authentication print job is not stored in the authenticated box in Step S5 ("NO" in Step S5), processing proceeds to Step S17, which is illustrated in FIG. 10.

In Step S17, the control unit 4 judges whether or not an authentication print job whose data is currently being received exists. When reception of data for an authentication print job transmitted from the external terminal 71 is commenced, the job management unit 111 stores the data received via the communication I/F unit 101 as mentioned in the above. When the entirety of the data has been stored to the job management unit 111, processing is executed where the HD management unit 110 stores such data to the authenticated box provided to the HD 105.

When the control unit 4 judges that an authentication print job whose data is currently being received does not exist ("NO" in Step S17), the processing returns to Step S1. Here, when data for an authentication print job is not stored in the authenticated box ("NO" in Step S5), and at the same time, an authentication print job whose data is currently being received does not exist ("NO" in Step S17), no authentication print job exists for execution by the multifunction peripheral 1. In such a case, user authentication is not successfully performed, and the screen displayed returns to the login screen 201 for receiving a login request from a user.

In this sense, the control unit 4, the user operation panel 8 and the like have the function of not performing user authentication successfully and returning to a state for receiving a user authentication request from a user when receiving an authentication request from a user when reception of data for an authentication print job has not been completed and reception of data is not in progress as well. This corresponds to the processing in "NO" in Step 5 and "NO" in Step S17.

When judging that an authentication print job whose data is currently being received exists ("YES" in Step S17), the control unit 4 executes reception-in-progress screen display processing corresponding to Step S18.

FIG. 11 is a flowchart illustrating subroutines of the reception-in-progress screen display processing.

As illustrated in FIG. 11, the control unit 4 refers to data included in the header portion of data for an authentication print job which is being received, and thereby reads out (obtains) information indicating a total number of pages P and a total quantity of data Q of the authentication print job (Step S51). As description has been already provided in the above, the reception of data for an authentication print job is performed in the order of first the header portion and then the print data portion. Thus, the information which is included in the header portion and which indicates the total number of pages P and the total quantity of data Q of an authentication print job is obtained before reception is completed of an entirety of data for an authentication print job.

Subsequently, a measurement is performed of a reception time T1. The reception time T1 is an amount of time required for receiving print data (data corresponding to one page) of a page which is first received following the present point (for instance, the print data of the first page when the first page has not been received at the present point), among the print data of the first page—the Pth page included in the print data portion (Step S52). More specifically, the reception time T1 indicates the time required between the commencement and the completion of the reception of data corresponding to one page. For the measurement of the time T1, the timer 112 may be used, or another internal timer (undepicted) may be used.

Further, a calculation of time R1, which is an estimated amount of time required for the reception of the entire quantity of data from the present point, is performed (Step S53). More specifically, time R1 is calculated by multiplying the reception time T1 measured in the above and the number of pages of the print data which has not been received at the present point. For instance, the number of pages remaining to be received is indicated by (P−2) when the second and the following pages have not yet been received at the present point. The calculation of time R1 is performed in such a manner as described in the above under the presumption that data amount of each of the pages included in the print data does not differ greatly and the amount of time required for receiving data corresponding to one page is substantially the same for each of the pages.

Following this, calculation is performed of an expected amount of time R2 required for storing (accumulating) data for an authentication print job to the authenticated box (Step S54). More specifically, R2 is calculated by multiplying the total quantity of data Q and a time T2. The time T2 is determined in advance as the time required for storing a unit quantity of data (for instance, 1 megabyte) to the authenticated box of the HD 105. For instance, if the total data quantity Q is 10 megabytes and the time T2 is 1 (second/megabyte), R2 is calculated as 10 seconds.

Following this, a value R obtained by adding R1 and R2 is calculated as the time remaining until the completion of the reception of data (including the time required for storing data), and display data is generated for the reception-in-progress screen 203 including a countdown display portion 230 (illustrated in FIG. 7). The reception-in-progress screen 203 is displayed on the liquid crystal display 81 of the user operation panel 8 according to the display data so generated (Step S55), and the processing returns to the main routines.

Here, when performing countdown display of time R, display is performed such that the time displayed is decremented by one second from the original value R for every second elapsing. Therefore, in a case where R=20 (seconds), countdown display is performed such that the displayed time decreases in the order of 20, 19, 18, . . . , 2, 1, 0. The display control is performed according to the display data so as to enable such countdown display in the countdown display portion 230.

Further, the time point at which the time R has elapsed coincides with the time point where the storing of data for an authentication print job to the authenticated box is completed. Following this point, the control unit 4 lists the authentication print jobs, registers an authentication print job among the authentication print jobs listed to the printing queue, and issues an instruction for execution of the authentication print job as described in the following. However, since such processing as the listing, the registering, and the issuing of an instruction with respect to the printer unit 3 is executed in an extremely short amount of time (for instance, in few milliseconds) by the control unit 4, the time point at which the time R has elapsed can be considered as being substantially equivalent to a time at which an authentication print job is executed. Accordingly, it could be said that the displaying of the time R is equivalent to displaying information related to the amount of time expected to be required for the execution of an authentication print job.

Note that the countdown display of the time R corresponding to such information need not be performed by decrementing the time displayed by one second, but may be performed by decrementing the time displayed by a predetermined unit of time, for instance, 5 seconds (in which case the time displayed decrements in the order of 20, 15, 10, 5, 0 starting from R).

In addition, such information need not be displayed in units of seconds. Other forms of displaying the information are acceptable, provided that the user informed of the approximate amount of time remaining until the execution of an authentication print job. For instance, a method may be applied of shortening a length of a bar graph, whose length indicates the remaining amount of time R, in predetermined units. For instance, the predetermined unit may be one second, and in such a case, the length of the bar graph indicating the remaining time R shortens every second by a length corresponding to one second.

Further, the method applied in displaying the information is not limited to the method of performing countdown display of the remaining amount of time. For instance, a method may be applied of displaying a clock time after the elapse of time R with respect to the present time. More specifically, when the present time is 10:10:00 and the time R is 60 seconds, the time after the elapse of time R is displayed as 10:11:00 when applying such a method.

Further in addition, the user is informed of the approximate amount of time remaining by displaying the remaining amount of time R for only a predetermined interval (for instance, several seconds) and stopping (turning off) the displaying after the predetermined interval. Even in such a case, the user will have an idea of approximately how much time is remaining by viewing the display of the remaining amount of time R during the predetermined interval. Also, an arrangement may be made such that the displaying of the remaining amount of time R is continued after the predetermined interval.

Returning to FIG. 10, the control unit 4 judges whether or not touch input has been performed with respect to the "print later" key 233 while reception of data for an authentication print job is in progress.

When judging that touch input with respect to the "print later" key 233 has not been performed ("NO" in Step S19), the control unit 4 judges whether or not any problems are occurring in the own device (the multifunction peripheral 1) (Step S20). Here, the term "problems" refers to such cases as where the above-mentioned exterior covers are left in an opened-state and the like.

When judging that no problems are in occurrence ("NO" in Step S20), the control unit 4 judges whether or not the storing of data for an authentication print job to the authenticated box of the HD 105 has been completed (Step S21) following the completion of reception of data for the authentication print job. In specific, such judgments are performed by the HD management unit 110. When it is judged that the storing of the received data to the authenticated box has not yet been completed, or that is, when it is judged that the reception of data is still in progress ("NO" in Step S21), the processing returns to Step S19.

The processing in Steps S19, S20, and S21 are repeatedly executed in the stated order until it is judged that the storing of the received data to the authenticated box has been completed.

When it is judged that the storing of the received data to the authenticated box has been completed ("YES" in Step S21), processing proceeds to Step S6 illustrated in FIG. 9.

In Step S6, listing is performed of authentication print jobs stored in the authenticated box at the present point, as already mentioned in the above. Here, the authentication print job being stored in the authenticated box at the present point corresponds to the authentication print job whose data was being received in the judgment in Step S17.

This authentication print job is registered to the printing queue in Step S7, and an instruction is issued for execution thereof in Step S8. Accordingly, the authentication print job is executed.

Returning to FIG. 10, when judging in Step S19 that touch input has been performed by the authenticated user with respect to the "print later" key 233 during the reception of data for an authentication print job ("YES" in Step S19), the control unit 4 causes the screen displayed to be switched to the top screen (Step S24). In such a case, the authentication print job whose data had been in reception is not executed (prohibited) even when the reception and the storing of the data to the authenticated box is completed. This is for the following reasons.

The touch input made by the authenticated user with respect to the "print later" key 233 is an instruction that indicates that the authenticated user desires to log out temporarily from the multifunction peripheral 1 and to execute the authentication print job when he/she logs in to the multifunction peripheral 1 once again later. Thus, configuration is made such that the processing performed in a case where touch input has not been performed as described in the above ("NO" in Step S19) is not performed in a case where touch input has been made with respect to the "print later" key 233. That is, the processing procedure where processing proceeds to Step S6 via Steps S20 and S21, and then further proceeds to Step S7, where an authentication print job is registered to the printing queue, is not applied in such a case.

In this sense, the control unit 4, the user operation panel 8 and the like function as a prohibition instruction receiving unit that receives, while reception of data for an authentication print job is in progress, an instruction for prohibiting the execution of the authentication print job from the user. This corresponds to the processing in Step S19. Further, the control unit 4 and the like function as a job control unit that prohibits the execution of an authentication print job even when user authentication has been successfully performed. This corresponds to the processing performed when receiving an instruction for prohibiting the execution of an authentication print job from the user, or that is, the processing performed when the result of the judgment in Step S19 is "YES", where the processing proceeds to Step S24, but does not proceed to Step S7 via. Steps S20, S21, and S6.

From the top screen, input operations by the authentication user is received (Step S25). Such input operations include, for instance, an instruction for execution of another job. When receiving an instruction for execution of another job, the control unit 4 executes operations in accordance with the instruction received. Until an instruction for logout processing is received, the control unit 4 receives input operations from the authenticated user from the top screen. When an instruction for logout processing is received ("YES" in Step S26), the control unit 4 performs logout processing and processing returns to Step S1 illustrated in FIG. 9.

In such a case where logout processing has been performed, the authenticated user is able to log in to the multifunction peripheral 1 once again. Further, at a point where the authenticated user logs in once again (Step S4), an authentication print job which has remained unexecuted remains stored in the authenticated box ("YES" in Step S5). The authentication print job remains unexecuted in the authenticated box since touch input has been performed with respect to the "print later" key 233 ("YES" in Step S19) as described in the above. Subsequently, the registering of the authentication print job to the printing queue is performed in Step S7 via Step S6, and the authentication print job which has remained unexecuted is executed.

In this sense, the control unit 4, the user operation panel 8 and the like function as an invalidation instruction receiving unit that receives, from an authenticated user, an invalidation instruction for invalidating a result of user authentication. This corresponds to the processing in Step S26, where an instruction is received for performing logout processing. Further, the control unit 4 and the like have the functions of invalidating a user authentication result when an invalidation instruction is received, and invalidating the prohibition of the execution of an authentication print job and executing the authentication print job when another user authentication in response to another user authentication request is successfully performed. This corresponds to the processing performed in Steps S1-S7 following logout processing performed in Step S26, where the authentication print job is executed when user authentication is successfully performed once again by the authenticated user.

In addition, when judging in Step S20 that a problem has occurred during the reception of data for an authentication print job ("YES" in Step S20), the control unit 4 switches the screen displayed to the warning screen 204 (illustrated in FIG. 8) (Step S22). When the problem which has occurred is resolved (Step S23), the control unit 4 switches the screen displayed to the top screen through the processing in Step S24. Further, when it is judged that an instruction for logout processing has been received in Step S26 via Step S25, the processing returns to Step S1.

In this case, similar to the case described in the above where touch input of the "print later" key 233 is performed by the user, the processing procedure where the processing proceeds to Step S6 via Step S21, and then further proceeds to Step S7, where an authentication print job is registered to the printing queue, is not applied. Thus, an authentication print job is not executed (prohibited) even when the reception and the storing of the data to the authenticated box is completed. This is for the following reasons.

That is, in a case where some kind of problem occurs during the reception of data for an authentication print job, the execution of the authentication print job immediately following the storing of the data should be avoided even when the problem has been resolved. Such a measure is taken since, however low the possibility may be, there may be cases where, for instance, the image quality of an authentication print job is degraded compared to before the occurrence of the problem due to the characteristics of the problem having occurred. Hence, in the present embodiment, configuration is made such that, when logout processing is performed after the problem having occurred is successfully resolved, image stabilization control is performed in order to maintain the quality of images to be formed at a constant level over a long period of time. The image stabilization control as referred to here includes such operations as registration correction and gradation correction. Accordingly, the degradation of image quality is prevented through such image stabilization control being performed after the authenticated user has logged out temporarily. Thus, when the authenticated user logs in after such image stabilization control has been performed, the authenticated user is able to execute the authentication print job at a state where the image quality has not degraded.

In this sense, the control unit 4 and the like function as a determination unit that determines that a problem, which puts the own device in a state where the execution of an authentication print job is impossible, has occurred during the reception of data for the authentication print job. This corresponds to the processing in Step S20. Further, the control unit 4 and the like function as a job control unit prohibiting the execution of an authentication print job whose data is in reception, even when the own device returns to a state where the execution of the authentication print job is possible by the problem being resolved. This corresponds to the processing performed when the result of the judgment in Step S20 is "YES", where the processing proceeds to Step S22, but does not proceed to Step S7 via Steps S20, S21, and S6. Further, the control unit 4 and the like have the function of causing, when the execution of an authentication print job has been prohibited, the display to switch from displaying the screen indicating the information to displaying a screen for receiving, from the user, an instruction for execution of another job that differs from the authentication print job. This corresponds to the processing in Step S24.

In Steps S12 and S15 illustrated in FIG. 9, when the control unit 4 judges that an authentication print job whose data is currently being received exists, the processing proceeds to the reception-in-progress screen display processing in Step S18. As such, when another authentication print job is received and the reception of the data for the other authentication print job is commenced during the execution of an authentication print job having been received previously, the reception-in-progress screen 203 is displayed with respect to the other authentication print job as well. Thus, the user is informed of the time R which corresponds to the time the user has to wait until the execution of the other authentication print job. Here, note that the execution of an authentication print job includes the registration of the authentication print job to the printing queue.

Subsequently, when the processing with respect to the other authentication print job proceeds to Step S8 via Steps S18-S21, S6, and S7, the other authentication print job is executed following the execution of an authentication print job having been received previously. Thus, the continuous execution of multiple authentication print jobs is realized with respect to one user authentication, and input operations are facilitated for the authenticated user.

However, although the operability of the multifunction peripheral 1 for the authenticated user may be improved by making such a configuration, at the same time, such a configuration may impair the convenience of the multifunction peripheral 1 for other users. More specifically, when user authentication of the user performed with respect to an authentication print job is continuously applied (without requiring a separate user authentication of the user) to another authentication print job later received, and the continuous execution of the other authentication print job is permitted over a long term of time from the instruction for execution of the authentication print job, the authenticated user is caused to wait for an extended period of time in front of the multifunction peripheral 1 for printed documents to be output. This leads to a risk arising of the operability of the multifunction peripheral 1 for other users being reduced. This is since another user would not be able to perform input operations for user authentication with respect to an authentication print job he/she has requested while the authenticated user is waiting for the printed documents to be output in front of the multifunction peripheral 1.

In view of such a risk, configuration is made in the present embodiment such that continuous execution of authentication print jobs by the authenticated user is permitted only under certain conditions by utilizing a timer which performs measurement of the predetermined five second interval. That is, continuous execution of authentication print jobs is permitted when data for another authentication print job is received within five seconds from when the printer unit 3 is instructed to execute an authentication print job that has been last listed ("YES" in Step S12 or Step S15). On the other hand, continuous execution of authentication print jobs is not permitted and the control unit 4 performs logout processing (Step S16) when data for another authentication print job is not received within five seconds from the instruction of execution for the authentication print job that has been last listed ("NO" in Step S15). Here, as description has been already provided in the above, the execution of the authentication print job last listed is performed by the registration thereof to the printing queue.

According to this configuration, when it is presumed, for instance, that three authentication print jobs A, B, and C exist, when data for the authentication print job B is received within 5 seconds from the execution of the authentication print job A, and further, when data for the authentication print job C is received within 5 seconds from the execution of the authentication print job B, the three authentication print jobs A, B, and C are continuously executed as if they compose one set. Further, in this case, the three authentication print jobs A, B, and C are continuously executed with respect to a user authentication having been performed in response to initial input operations performed by a user for the authentication print job A.

As such, there is no need for the authenticated user to perform separate input operations for another authentication print job when the data for another authentication print job is received within five seconds as described in the above. In addition, when data for another authentication print job is received following the elapse of five seconds, the authenticated user is once again required to perform input operations separately for a new user authentication. This is advantageous in that the execution of another authentication print job is prohibited until input operations for another user authentication is performed. Thus, while confidentiality of authentication print jobs is maintained, the authenticated user is freed from the need to wait in front of the multifunction peripheral 1 concerned about when the reception of data will be commenced and when the printed documents will be output, especially when the network is crowded or under similar conditions.

As such, since the situation where the authenticated user is waiting for a long time in front of the multifunction peripheral 1 is prevented as mentioned in the above, the convenience of the multifunction peripheral 1 for other users is improved, and the other users are able to perform input operations for user authentication and the like with more ease. Here, it is to be noted that five seconds is merely one example of the predetermined interval, and needless to say, the predetermined interval is not limited to five seconds. The predetermined interval may be any interval of time, for instance 10 or 15 seconds, provided that the interval is appropriate as the period of time users have to wait for the commencement of the reception of a subsequent authentication print job (taking into consideration not only the amount of time the authenticated user would have to wait, but also the amount of time other users would have to wait as well). Further, configuration is to be made such that a timer for measuring the predetermined interval is activated in the multifunction peripheral 1.

In this sense, it can be said that the control unit 4 and the like have the functions of performing, (i) when reception of data for another authentication print job is commenced within a predetermined interval from the execution of an authentication print job, a first control of executing the other authentication print job by applying a result of user authentication and (ii) when the reception of data for the other authentication print job is commenced following elapse of the predetermined interval, a second control of executing the other authentication print job by not applying user authentication result and by applying a result of another user authentication when the other user authentication is successfully performed. Here, the other user authentication is performed in response to another user authentication request received from the user for the execution of the other authentication print job. Further, the first control corresponds to the processing performed when proceeding to Step S18 from "YES" in Step S12 and "YES" in Step S15, while the second control corresponds to the processing performed when proceeding to Step S1 from "NO" in Step S15 and further executing the processing in Steps 1-8. In addition, when the processing proceeds from "NO" in Step S15 to S1, the control unit 4 and the like execute a function of automatically invalidating a user authentication result (logout processing) and returning to a state for receiving a user authentication request from a user (login processing).

Additionally, although description has been made in the above that, when an authentication print job whose data has already been received does not exist and at the same time, an authentication print job whose data is currently being received does not exist when the predetermined interval of five seconds has elapsed, logout processing is automatically performed, the present invention is not limited to this. For instance, arrangement may be made such that logout processing is performed when the control unit 4 receives a manual instruction from the authenticated user for logging out from the multifunction peripheral 1 when the predetermined interval of five seconds has elapsed.

Figure 12:
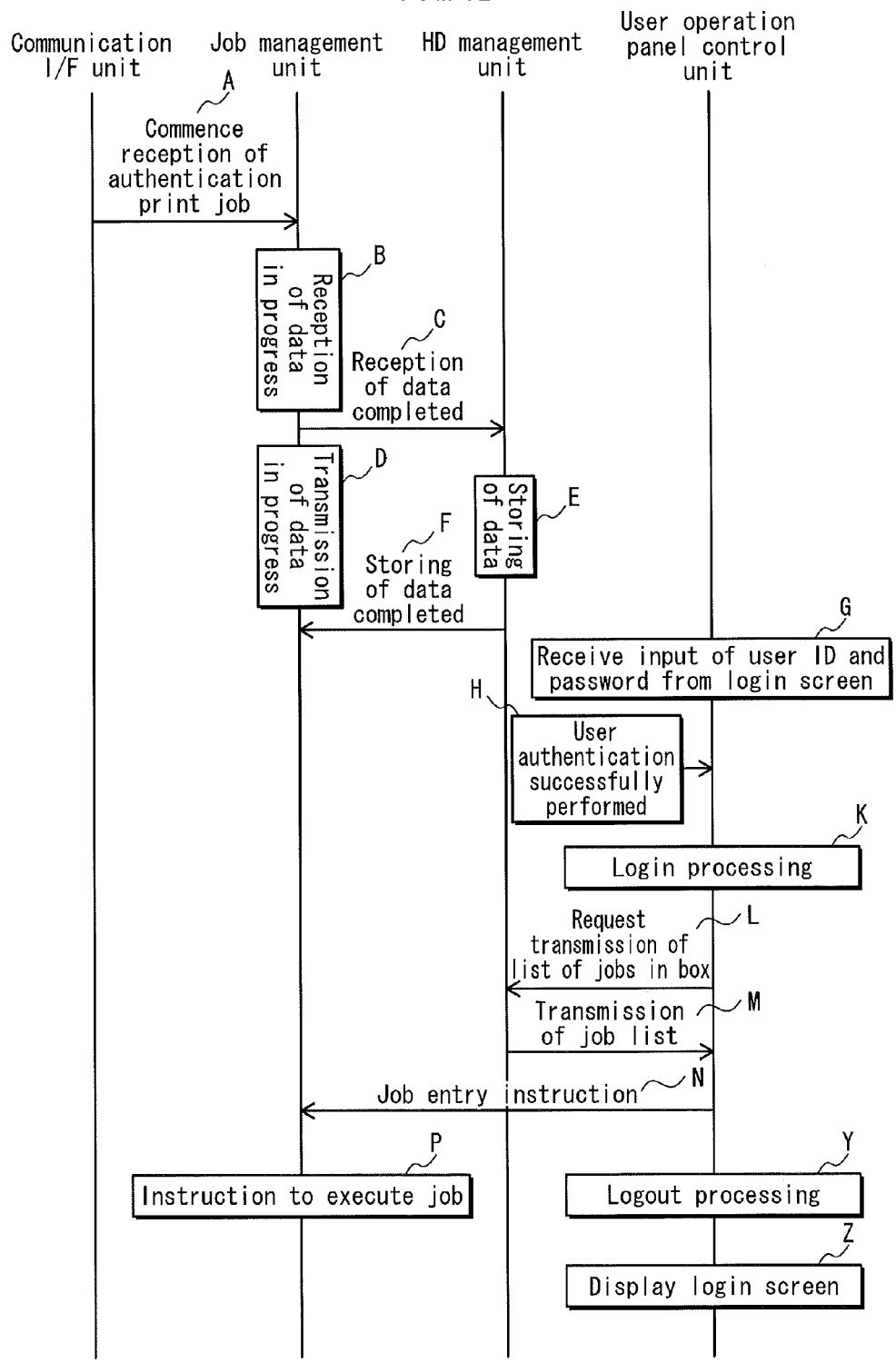
FIG. 12 illustrates an example of a command sequence in the control unit when receiving data for an authentication print job.

FIG. 12 is a diagram illustrating an example of a command sequence when user authentication is performed after completion of reception of data for an authentication print job.

As illustrated in FIG. 12, the job management unit 111, when receiving an instruction for receiving data for an authentication print job from the I/F unit 101 (A), receives the data in the order of first the header portion and then the printing data portion thereof, and stores the data in an internal memory (B). When the reception of the data is completed, the job management unit 111 notifies the HD management unit 110 of the completion of the reception of the data (C). In addition to this, the job management unit 111 specifies, from among the boxes provided to the HD 105, a box corresponding to the user ID and the password included in the header portion of the data, and instructs the HD 105 to store the data in the box so specified.

When receiving the instruction from the job management unit 111, the HD management unit 110 stores the data to the specified box (E). Accordingly, the data is transferred from the job management unit 111 to the corresponding box in the HD 105 (D).

When the storing of data for an authentication print job to the corresponding box has been completed, the HD management unit 110 notifies the job management unit 111 of the completion (F).

The user operation panel control unit 109 receives input of a user ID and a password from a user from the login screen 201 (G) (corresponds to Step S2 in the above).

The authentication unit 106 performs user authentication according to the user ID and the password input by the user. When user authentication is successfully completed (H) (corresponds to "YES" in Step S3), the user operation panel control unit 109 performs login processing (K) (corresponds to Step S4), specifies, from among the boxes provided to the HD 105, a box (authenticated box) corresponding to the user ID and the password having been input by the user, and requests the HD management unit 110 to transmit a list of authentication print jobs (job list) stored in the authenticated box (L).

When receiving the request for transmission of the job list from the user operation panel control unit 109, the HD management unit 110 reads out a job ID included in a header portion of data for an authentication print job presently stored in the specified authenticated box, and transmits information indicating the job ID so read out as the job list to the user operation panel control unit 109 (M) (corresponds to Steps S5 and S6). Note that, when the authenticated box currently stores multiple authentication print jobs, the job list includes a job ID for each of the authentication print jobs.

The user operation panel control unit 109 transmits the job list so received to the job management unit 111 as a job entry instruction (N).

Subsequently, the job management unit 111 specifies an authentication print job to be executed from the job IDs included in the job list so received, registers the authentication print job so specified to the printing queue (corresponds to Step S7), and instructs the printer unit 3 to execute the authentication print job (P) (corresponds to Step S8). Hence, printing is executed in accordance with the authentication print job so executed. In a case where multiple authentication print jobs exist, the authentication print jobs are registered to the printing queue one by one as description has been provided in the above, and are sequentially executed one by one (corresponds to Steps S7-S11).

The user operation panel control unit 109 performs logout processing when receiving an instruction from the user for logging out from the multifunction peripheral 1 (Y) (Step S16), and switches the screen displayed to the login screen 201 (Z) (corresponds to Step S1).

Figure 13:
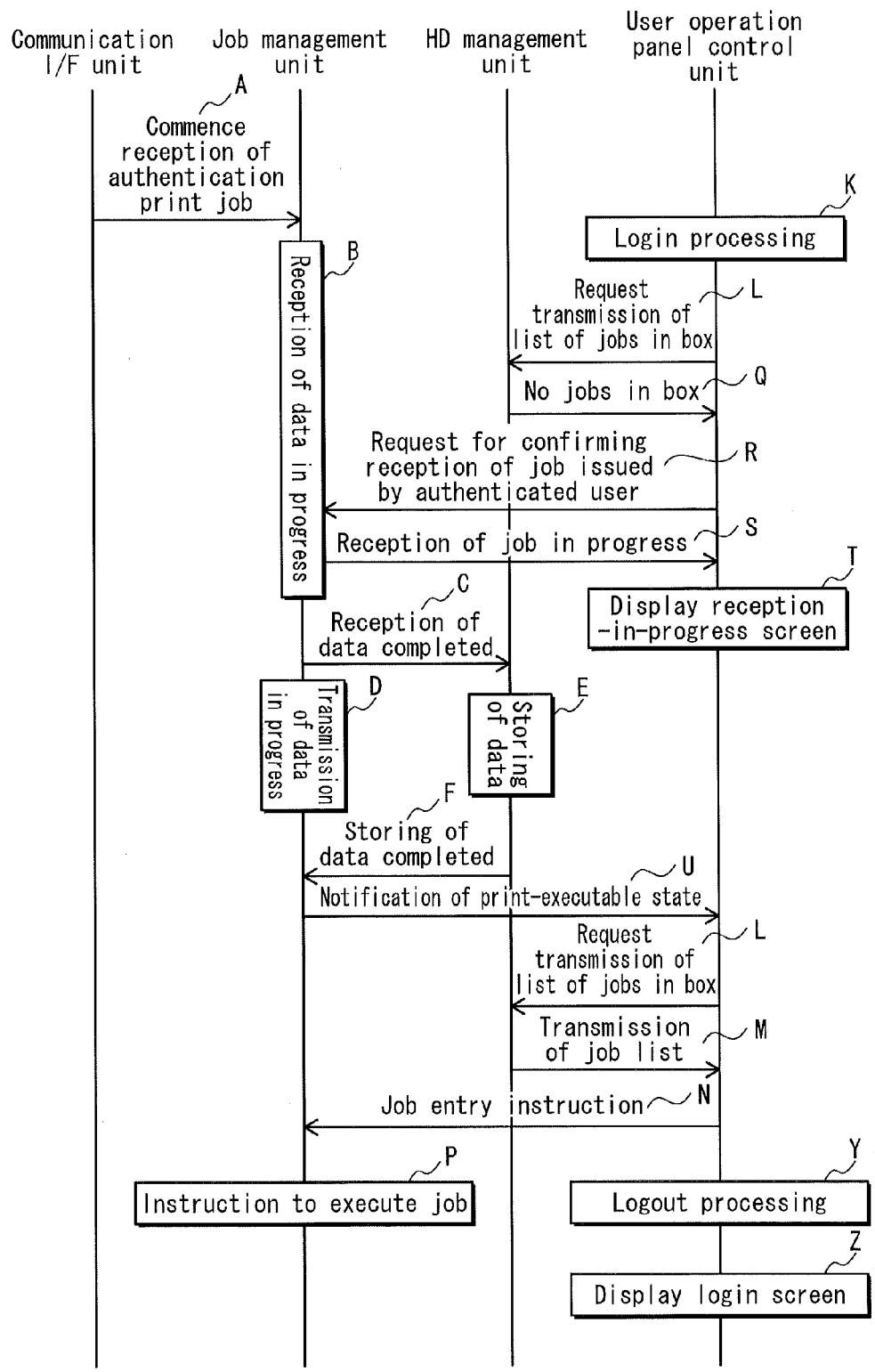
FIG. 13 illustrates an example of a command sequence in the control unit when receiving data for an authentication print job.

In FIG. 12 referred to in the above, description is made on a case where an authentication print job whose data is already stored in the HD 105 is executed when user authentication is successfully performed with respect to the multifunction peripheral 1. In contrast, FIG. 13 illustrates a case where user authentication is performed during reception of data for an authentication print job. Note that, with reference to FIG. 13 and the following drawings, description of portions of the command sequence which are similar to those illustrated in FIG. 12 is omitted, and the same symbols (A, B, . . . , Z) as provided in FIG. 12 are provided thereto. In addition, the processing of receiving a user ID and the like from the login screen (G) and the processing corresponding to the successful completion of user authentication (H), which have been illustrated in FIG. 12, are not illustrated in FIG. 13 and the following drawings.

As illustrated in FIG. 13, after performing login processing (K), the user operation panel control unit 109 requests for the transmission of the job list indicating authentication print jobs stored in the authenticated box (L). At the point where this request for transmission is issued, reception of data for an authentication print job is in progress (B), and thus, an authentication print job has not yet been stored to the authenticated box (corresponds to "NO" in Step S5). Hence, the HD management unit 110 transmits a signal indicating that an authentication print job does not exist in the authenticated box to the user operation panel control unit 109, instead of the job list (Q).

The user operation panel control unit 109, when receiving this signal, transmits a request for confirming that an authentication print job whose data is currently being received exists to the job management unit 111 (R).

The job management unit 111, when an authentication print job whose data is currently being received exists (corresponds to "YES" in Step S17), transmits a signal indicating that another authentication print job whose data is currently being received exists to the user operation panel control unit 109 (S).

The user operation panel control unit 109 switches the screen displayed to the reception-in-progress screen 203 when receiving this signal (T) (corresponds to Step S18). Hence, the authenticated user is able to acknowledge approximately how long he/she will have to wait until the execution of an authentication print job by viewing the reception-in-progress screen 203.

When the reception of data for an authentication print job is completed, and further, when storing of the data to a corresponding box of the HD 105 is completed (C-F) (corresponds to "YES" in Step S21), the job management unit 111 transmits a notification of a print-executable state to the user operation panel control unit 109 (U).

When receiving this notification, the user operation panel control unit 109 specifies an authenticated box in the HD 105, and requests the HD management unit 110 to transmit the job list listing authentication print jobs stored in the specified authenticated box (L). Following this, when receiving the job list from the HD management unit 110 (M), the user operation panel control unit 109 transmits the job list so received to the job management unit 111 as the job entry instruction (N) (corresponds to Step S6).

As such, in a case where user authentication is performed while the reception of data for an authentication print job is in progress, the execution of the authentication print job is performed automatically when the reception of data for the authentication print job is completed. Hence, the user is not required to perform operations for user authentication once more after waiting for the completion of the reception of data for an authentication print job. Thus, the operability of the multifunction peripheral 1 is improved compared to a case where the user is required to perform operations for user authentication once more after completion of reception of data for an authentication print job.

Figure 14:
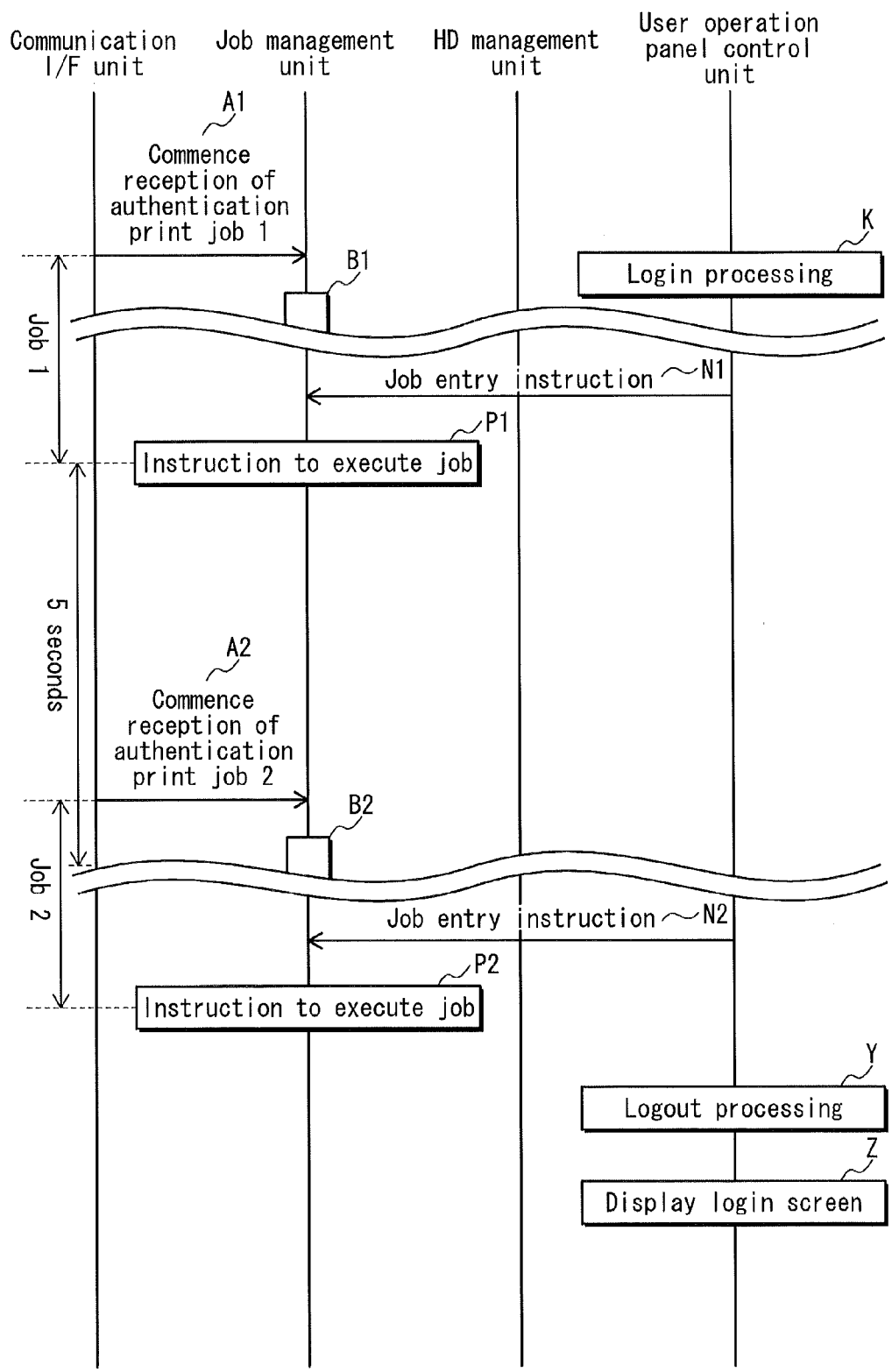
FIG. 14 illustrates another example of a command sequence in the control unit when receiving data for an authentication print job.

As explanation has been provided in the above, FIG. 13 illustrates a case where user authentication is performed during reception of data for an authentication print job. In contrast, FIG. 14 illustrates a case where data for another authentication print job is received after data for an authentication print job has been previously received. Note that in FIG. 14, illustration of a portion of the processing corresponding to data reception (B)—job entry instruction (N) is omitted.

As illustrated in FIG. 14, description is provided hereinafter on a case where sequential reception of data for an authentication print job 1 and data for an authentication print job 2 is performed. Here, configuration is made such that, when receiving data for the authentication print job 2 within five seconds (A2) (corresponds to "YES" in Step S12) from the instruction for the execution of the authentication print job 1 (P1), the job management unit 111 issues an instruction for execution of the authentication print job 2 (P2) via the same command sequence as applied in the execution of the authentication print job 1 (corresponds to Steps S18-S21, and S6-S8). In such a case, processing is performed as if the authentication print jobs 1 and 2 compose one set, and the jobs are sequentially executed one by one with respect to one user authentication operation (login processing (K)) having been performed by the user. Hence, the operations required on the side of the user are simplified, and accordingly, the operability of the multifunction peripheral 1 is improved.

Here, in a case where the reception of data for the authentication print job 2 is accepted after the elapse of five seconds (corresponds to "NO" in Step S15), the printer unit 3 is not instructed to execute the authentication print job 2 until after logout processing is performed as described in the above. Thus, data for the authentication print job 2 remains stored in the authenticated box of the HD 105. When user authentication is performed after logout processing where the user logs out from the multifunction peripheral 1 temporarily (corresponds to Step S16), the authentication print job 2 is executed (corresponds to Steps S1-S8).

Figure 15:
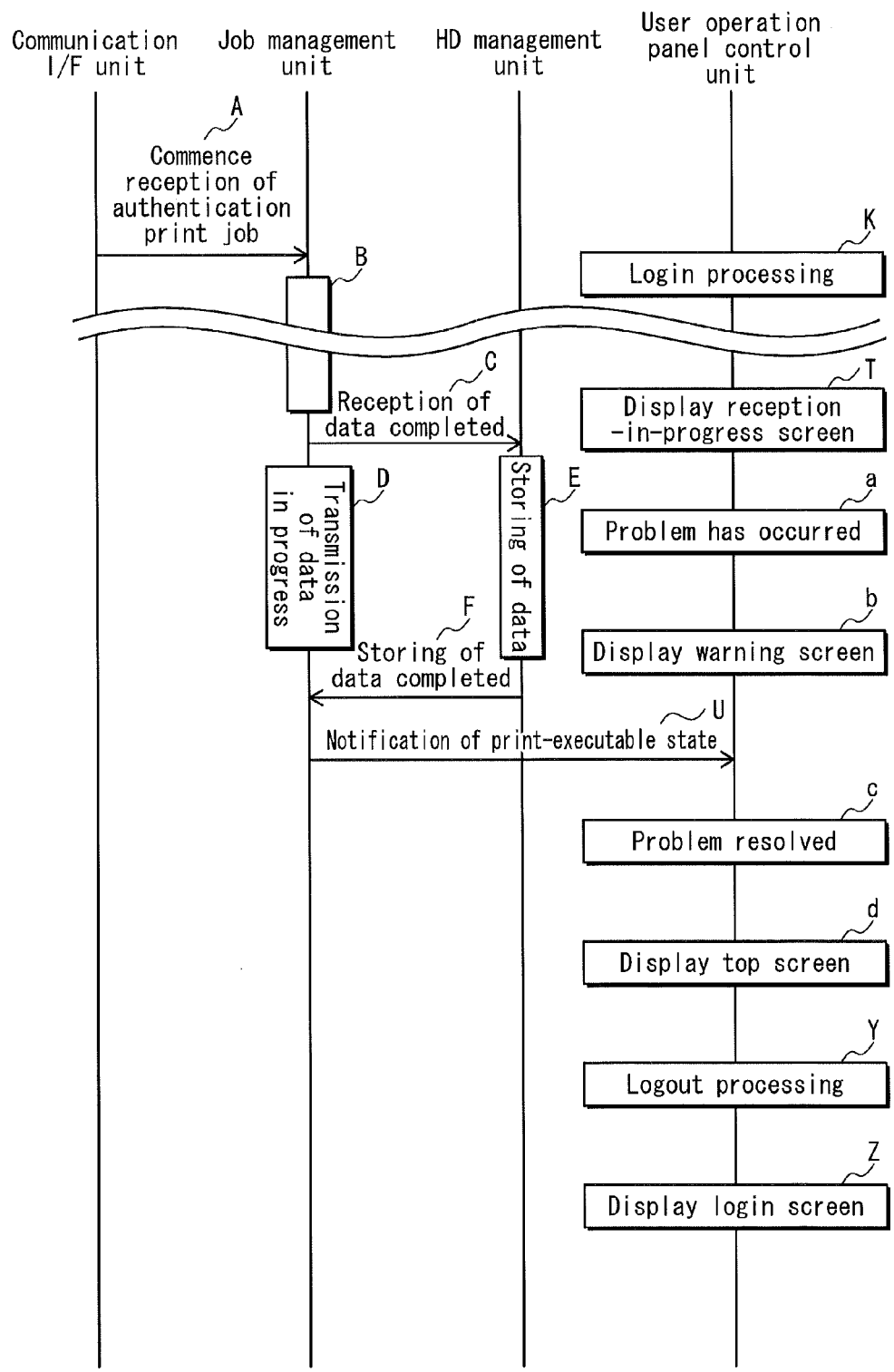
FIG. 15 illustrates yet another example of a command sequence in the control unit when receiving data for an authentication print job.

FIG. 15 illustrates an example of a command sequence applied when a problem has occurred in the own device (multifunction peripheral 1) before completion of storing of data for an authentication print job to the authenticated box in the HD 105. Note that in FIG. 15, illustration of a portion of the processing corresponding to data reception (B) is omitted.

As illustrated in FIG. 15, when a problem occurs while storing of data for an authentication print job to an authenticated box of the HD 105 is in progress (a) (corresponds to "YES" in Step S20), the user operation panel control unit 109 switches the screen displayed to the warning screen 204 (b) (corresponds to Step S22). Here, even when receiving the notification indicating the print-executable state from the job management unit 111 (U), the user operation panel control unit 109 does not request the HD management unit 110 to transmit a job list, and does not issue a job entry instruction with respect to the job management unit 111. Further, when the problem has been resolved (c), the user operation panel control unit 109 switches the screen displayed to the top screen (d), and performs logout processing according to instructions provided by the user for logging out from the multifunction peripheral 1 (Y) (corresponds to Steps S23-S26).

As such, the authentication print job is not executed until logout processing has been performed and the user has logged out from the multifunction peripheral 1, and data for the authentication print job remains stored in the authenticated box of the HD 105. Further, the authentication print job is executed when user authentication is performed once again after logout processing has been performed. This is similar to the processing in the case where data for the authentication print job 2 is received after the elapse of five seconds, as description has been provided with reference to FIG. 14.

As description has been provided in the above, in the present embodiment, when user authentication is performed during reception of data for an authentication print job, the reception-in-progress screen 203 is displayed on the liquid crystal display 81 of the user operation panel 8. The reception-in-progress screen 203 includes display of the time R, which indicates an expected amount of time required until the execution of the authentication print job, and thus, the authenticated user is able to acknowledge the approximate amount of time he/she would have to wait until the execution of the authentication print job having been issued by him/her by referring to the time R. This provides the authenticated user with choices to choose from regarding the actions to be taken by him/her during the time required for the multifunction peripheral 1 to execute the authentication print job. That is, the authentication user may choose to remain waiting in front of the multifunction peripheral 1 when considering that the time he/she would have to wait until the execution of the authentication print job is comparatively short, or otherwise, to leave the multifunction peripheral 1 temporarily to work on other tasks, and then return to the multifunction peripheral 1 immediately before the elapse of the time R when considering that the time he/she would have to wait is comparatively long. Thus, the multifunction peripheral 1 is made more convenient for an authenticated user, and hence, has an enhanced level of convenience.

Here, note that the present invention is not limited to an image forming apparatus, and may be an image forming method for executing an authentication print job or an program which causes a computer to execute the image forming method. Further, the image forming program pertaining to the present invention may be recorded on various types of computer-readable recording media including: magnetic disks such as magnetic tape and flexible disk; optical recoding media such as a DVD-ROM, a DVD-RAM, a CD-ROM, a CD-R, an MO, and a PD; and flash memory type recording media. In addition, the image forming program pertaining to the present invention may be manufactured and/or distributed in the form of such recording media, or may be transmitted and/or supplied in the form of a computer program via various wired and wireless networks including the internet, broadcasts, electric communication lines, communication satellites, and etc.

In addition, the image forming program pertaining to the present invention need not be provided with all such modules as necessary to cause a computer to execute the above-described processing. For instance, a computer may be caused to execute the processing involved in the present invention by utilizing various general purpose programs that can be installed separately to an information processing device. Such general purpose programs include communication programs and programs included in operating systems (OS). Therefore, there is no need of recording all such modules on the above-described recording media storing the image forming program pertaining to the present invention, and in addition, it is not always required that all such modules be transmitted. Further in addition, a predetermined processing involved in the image forming program pertaining to the present invention may be executed by using special purpose hardware.

(Modifications)

Although description has been provided in the above on the present invention with reference to an embodiment thereof, the present invention is not limited to the embodiment thereof, and various modifications as described in the following are construed as being included in the scope of the present invention.

(1) In the embodiment, description has been provided that data for an authentication print job received by the I/F unit 101 from the external terminal 71, via the network 61, is temporarily stored to an internal memory (storing unit) by the job management unit 111 before being transferred to the HD 105 and being stored to an authenticated box in the HD 105, but the present invention is not limited to this. For instance, data for an authentication print job received by the I/F unit 101 may be directly transmitted to and stored to the HD 105. In addition, the storing unit for storing data is not limited to the HD 105, and for instance, the internal memory (storing unit) as referred to in the above may be used, or other storing units such as an SRAM or DRAM may be used.

When arrangement is made such that data is not stored to the HD 105, the need for calculating the time R2, which is the time expected to be required for the transferring and storing of data to the HD 105, in the reception-in-progress screen display processing is eliminated. That is, when the time required for the storing of data to an internal memory or an SRAM is extremely short and could be ignored, the time R may be considered as being equivalent to time R1.

Further, the point at which the reception of data is commenced by the I/F unit 101 may be considered as the timing at which the reception of data for an authentication print job is commenced, and similarly, the point at which data for an authentication print job is stored to a storage area (hard disc, internal memory, SRAM or the like) from which the data is to be read out for printing may be considered as the timing at which the reception of data is completed.

Additionally, description has been provided in the above that data for an authentication print job (PDL) received by the I/F unit 101 is converted into raster data, and then stored to the HD 105, but the present invention is not limited to this. The data format and the data conversion method applied to data for an authentication print job is not limited to the above, and for instance, a method may be applied of storing (saving) data for an authentication print job in the original format in which it has been received from the external terminal 71 and performing conversion thereof such that the data following the conversion is in a format required for the printing by the printer unit 3 to be performed appropriately.

(2) In the present embodiment, description has been provided on a structure where two forms of processing are both performed, namely (i) the displaying of the remaining time R in the reception-in-progress screen 203, which includes the countdown display portion 230, and (ii) the sequential execution of two authentication print jobs as if the two authentication print jobs compose one set, when data for another authentication print job is received within five seconds from the issuing of an instruction for execution of an authentication print job. However, the present invention is not limited to this. Since the displaying of the time R and the sequential execution of two authentication print jobs may be executed independently, a structure may be applied, for instance, where only one of the two types of processing is performed. More specifically, a structure where only the displaying is performed can be realized by performing Step S16 following Step S8 (in other words, by deleting Steps S9 through S15) in the flowchart in FIG. 9. Similarly, a structure where only the sequential execution of two authentication print jobs is performed can be realized by not performing the displaying of the reception-in-progress screen (Step S18) in the flowchart in FIG. 10.

(3) In the above, description is provided on a case where the liquid crystal display unit (liquid crystal display) 81 is provided as a display unit for displaying the reception-in-progress screen 203 and the like. The reception-in-progress screen 203 is a screen for displaying countdown display of the time R, which is one example of information related to an amount of time expected to be required for execution of an authentication print job. However, the display unit is not limited to the liquid crystal display, and other display units may be used, provided that the display unit to be used is capable of displaying such information. In addition, the display unit need not involve the use of liquid crystal material.

(4) In the embodiment, description has been provided on a case where the image forming apparatus pertaining to the present invention is applied to a tandem type color digital printer. However, the present invention is not limited to this. That is, the present invention is not limited to an image forming apparatus capable of forming color images, and may be applied to an image forming apparatus capable of forming at least one of color images and monochrome images. Further, the present invention may be applied to image forming apparatuses such as a copier, a printer, a fax machine (facsimile device) or the like, provided that the image forming apparatus has an authentication print job function of receiving an authentication print job from an external terminal via a network and executing the authentication print job received when authentication of a user having issued the authentication print job is successfully completed.

Furthermore, combinations of the above-described embodiment and the modifications are construed as being included in the scope of the present invention.

CONCLUSION

The description provided in the embodiment and the modifications above merely describes one aspect of the present invention for solving the technical problems presented in the Related Arts section. The embodiment and the modifications as described in the above can be summarized as follows.

One aspect of the present invention is an image forming apparatus that receives data for an authentication print job from an external terminal connected thereto via a network, receives a user authentication request from a user, and executes the job when the user authentication is successfully performed, the image forming apparatus comprising: a display unit; and a display control unit displaying information related to an amount of time expected to be required for the execution of the job on the display unit when the user authentication is successfully performed prior to completion of the reception of the data for the job.

In the image forming apparatus, the data for the job may include print data corresponding to an image to be printed out and information indicating a total number of pages of the print data in printed form, and the display control unit may obtain information indicating an amount of time required to receive print data corresponding to one page in printed form and thereby determine the amount of time expected to be required for the execution of the job according to (i) the amount of time required to receive print data corresponding to one page and (ii) the total number of pages.

The image forming apparatus may further comprise: a prohibition instruction receiving unit that receives, from the user, while the reception of the data for the job is in progress, a prohibition instruction for prohibiting the execution of the job; and a job control unit that prohibits, when the prohibition instruction is received by the prohibition instruction receiving unit, the execution of the job even when the user authentication has been successfully performed.

The image forming apparatus may further comprise: an invalidation instruction receiving unit that receives, from the user, an invalidation instruction for invalidating a result of the user authentication, wherein the job control unit may invalidate the user authentication result when the invalidation instruction receiving unit receives the invalidation instruction, and invalidate the prohibition of the execution of the job and execute the job when another user authentication in response to another user authentication request received from the user is successfully performed.

In the image forming apparatus, the display unit may include a display, the display control unit may cause the display to display a screen indicating the information, and the display control unit may cause, when the execution of the job has been prohibited, the display to switch from displaying the screen indicating the information to displaying a screen for receiving, from the user, an instruction for execution of another job that differs from the job.

The image forming apparatus may further comprise: a determination unit that determines that a problem has occurred during the reception of the data for the job, the problem putting the image forming apparatus into a predetermined state where the execution of the job is impossible; and a job control unit that prohibits the execution of the job, the reception of the data for the job being in progress, even when the image forming apparatus returns to a state where the execution of the job is possible by the problem being resolved.

The image forming apparatus may further comprise: an invalidation instruction receiving unit that receives, from the user, an invalidation instruction for invalidating a result of the user authentication, wherein the job control unit invalidates the user authentication result when the invalidation instruction receiving unit receives the invalidation instruction, and invalidates the prohibition of the execution of the job and executes the job when another user authentication in response to another user authentication request received from the user is successfully performed.

In the image forming apparatus, the display unit may include a display, the display control unit may cause the display to display a screen indicating the information, and the display control unit may cause, when the execution of the job has been prohibited, the display to switch from displaying the screen indicating the information to displaying a screen for receiving, from the user, an instruction for execution of another job that differs from the job.

The image forming apparatus may further comprise: a job control unit that performs, (i) when reception of data for another authentication print job is commenced within a predetermined interval from the execution of the job, a first control of executing the other job by applying a result of the user authentication, and (ii) when the reception of the data for the other job is commenced following elapse of the predetermined interval, a second control of executing the other job by not applying the user authentication result and by applying a result of another user authentication when the other user authentication is successfully performed, the other user authentication performed in response to another user authentication request received from the user for the execution of the other job.

In the image forming apparatus, when the reception of the data for the other job is not commenced within the predetermined interval, the job control unit may invalidate the user authentication result and return to a state for receiving a user authentication request from a user.

In the image forming apparatus, the information may be either (i) an estimated amount of time required until the execution of the job is commenced or (ii) an estimated time at which the execution of the job is to be commenced.

In the image forming apparatus, when the information is the estimated amount of time, the display control unit may cause the display unit to perform countdown display of the estimated amount of time.

In the image foaming apparatus, when the user authentication request is received from the user when the data for the job has not been received, the user authentication may fail and the image forming apparatus may return to a state for receiving a user authentication request from a user.

In the image forming apparatus, the display unit may include a display, and the display control unit may cause the display to display a screen indicating the information.

Another aspect of the present invention is an image forming apparatus that receives data for an authentication print job from an external terminal connected thereto via a network, receives a user authentication request from a user, and executes the job when the user authentication is successfully performed, the image forming apparatus comprising: a job control unit that performs, (i) when reception of data for another authentication print job is commenced within a predetermined interval from the execution of the job, a first control of executing the other job by applying a result of the user authentication, and (ii) when the reception of the data for the other job is commenced following elapse of the predetermined interval, a second control of executing the other job by not applying the user authentication result and by applying a result of another user authentication when the other user authentication is successfully performed, the other user authentication performed in response to another user authentication request received from the user for the execution of the other job.

In the image forming apparatus, when the reception of the data for the other job is not commenced within the predetermined interval, the job control unit may invalidate the user authentication result and may return to a state for receiving a user authentication request from a user.

According to the structure provided in the above, displaying is performed of the information related to the amount of time expected to be required for the execution of an authentication print job. Thus, the user is able to confirm the amount of time required until an authentication print job is executed by viewing the information. This provides the user with choices to choose from regarding the actions to be taken by him/her during the time required for the image forming apparatus to execute an authentication print job. That is, the user may choose either to wait for the execution of the authentication print job in front of the image forming apparatus or to leave the image forming apparatus temporarily to work on other tasks, and then return to the image forming apparatus immediately before the execution of an authentication print job. Thus, time wasted in front of the image forming apparatus waiting for an authentication print job to be executed is reduced, and thus, convenience of the image forming apparatus is improved, while the confidentiality of an authentication print job is maintained.

Additionally, according to the above, the image forming apparatus switches between operation modes according to whether or not reception of data for another authentication print job is commenced within a predetermined interval from the execution of an authentication print job. In first operation mode, the other authentication print job is executed without requiring the user to issue another authentication request, and in the second operation mode, the other authentication print job is executed only when another authentication request is issued by the user.

Accordingly, when the reception of data for the other authentication print job is commenced before the elapse of the predetermined interval, the user does not have to perform operations for issuing another authentication request. Thus, the operability of the image forming apparatus is improved. On the other hand, when the reception of data for the other authentication print job is commenced after the elapse of the predetermined interval, the other authentication print job is not executed unless another authentication request is issued by the user. Accordingly, the user, when desiring to leave the image forming apparatus after the elapse of the predetermined interval, can simply choose not to issue another user authentication request. Thus, the user is not required to wait in front of the image forming apparatus until the other authentication print job is executed even when desiring to maintain confidentiality, and thus, the time the user spends waiting in front of the image forming apparatus is reduced.

When the user leaves the image forming apparatus after the elapse of the predetermined interval, the image forming apparatus is made available to other users for operations for user authentication, for instance, and thus, the continuous use of the image forming apparatus by a single user over a long period of time is prevented. Thus, the convenience of the image forming apparatus is further improved while confidentiality is maintained.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus that receives data for an authentication print job from an external terminal connected thereto via a network, receives a user authentication request from a user, and executes the job when the user authentication is successfully performed, the image forming apparatus comprising:
   a job control unit that performs,
   (i) when reception of data for another authentication print job is commenced within a predetermined time interval from the execution of the job, a first control of executing the other job by applying a result of the user authentication, and
   (ii) when the reception of the data for the other job is commenced following elapse of the predetermined time interval, a second control of executing the other job by not applying the user authentication result and by applying a result of another user authentication when the other user authentication is successfully performed, the other user authentication performed in response to another user authentication request received from the user for the execution of the other job.

2. The image forming apparatus of claim 1, wherein when the reception of the data for the other job is not commenced within the predetermined time interval, the job control unit invalidates the user authentication result and returns to a state for receiving a user authentication request from a user.

\* \* \* \* \*